(12) United States Patent
Takahashi et al.

(10) Patent No.: US 7,520,676 B2
(45) Date of Patent: Apr. 21, 2009

(54) WHEEL SUPPORTING BEARING UNIT

(75) Inventors: Akira Takahashi, Kanagawa (JP); Tatsuo Wakabayashi, Kanagawa (JP)

(73) Assignee: NSK Ltd., Tokyo (JP)

( * ) Notice: Subject to any disclaimer, the term of this patent is extended or adjusted under 35 U.S.C. 154(b) by 298 days.

(21) Appl. No.: 11/439,264

(22) Filed: May 24, 2006

(65) Prior Publication Data

US 2006/0274983 A1 Dec. 7, 2006

(30) Foreign Application Priority Data

May 24, 2005 (JP) ............... P. 2005-150554
Apr. 17, 2006 (JP) ............... P. 2006-113714

(51) Int. Cl.
*F16C 32/00* (2006.01)
*G01P 3/42* (2006.01)

(52) U.S. Cl. ............... 384/448; 324/207.25; 324/173

(58) Field of Classification Search ............... 384/484, 384/445–448, 624; 324/174–173, 207.25; 340/5.6, 126, 438, 463, 870.16, 870.3, 870.31
See application file for complete search history.

(56) References Cited

U.S. PATENT DOCUMENTS

| | | | | |
|---|---|---|---|---|
| 4,259,637 A | * | 3/1981 | Bloomfield et al. | 324/207.25 |
| 5,357,160 A | * | 10/1994 | Kaneda et al. | 310/67 R |
| 5,762,425 A | * | 6/1998 | Ouchi | 384/448 |
| 5,851,074 A | * | 12/1998 | Sakamoto | 384/448 |
| 5,898,388 A | * | 4/1999 | Hofmann et al. | 340/870.31 |
| 5,986,448 A | * | 11/1999 | Yada et al. | 324/173 |
| 6,002,248 A | * | 12/1999 | Binder | 384/448 |
| 6,541,958 B2 | * | 4/2003 | Harada | 324/174 |
| 6,619,849 B2 | * | 9/2003 | Katano | 384/448 |
| 6,971,799 B2 | * | 12/2005 | Sato et al. | 384/448 |
| 7,170,281 B2 | * | 1/2007 | Harada | 324/207.25 |
| 7,320,258 B2 | * | 1/2008 | Tawara | 384/448 |
| 2003/0093188 A1 | * | 5/2003 | Morita et al. | 340/438 |
| 2005/0089253 A1 | * | 4/2005 | Koike et al. | 384/448 |

FOREIGN PATENT DOCUMENTS

| | | | |
|---|---|---|---|
| DE | 112004001668 T5 | | 7/2006 |
| EP | 558181 A1 | * | 9/1993 |
| JP | 10-315669 A | * | 12/1998 |
| JP | 2004263724 A | * | 9/2004 |
| JP | 2005-14906 A | | 1/2005 |
| WO | WO 2004/072747 A1 | * | 8/2004 |

* cited by examiner

*Primary Examiner*—Marcus Charles
(74) *Attorney, Agent, or Firm*—Sughrue Mion, PLLC

(57) ABSTRACT

An IC tag 23 is fixed to a central portion of an axially outer end portion face of a hub 10a which is a rotational ring which makes up the wheel supporting bearing unit 5a. Historical information of the wheel supporting bearing unit 5a is stored in the IC tag 23. The historical information stored in the IC tag 23 can be read easily by the use of an external device 28. Due to this, the traceability of the wheel supporting bearing unit 5a can be increased.

4 Claims, 19 Drawing Sheets

WHEEL SUPPORTING BEARING UNIT

BACKGROUND OF THE INVENTION

1. Field of the Invention

The present invention is related to ensure and facilitate history management of a wheel supporting bearing unit which rotatably supports a wheel to a suspension system of a vehicle.

2. Description of the Background Art

A wheel 1 which makes up a road wheel of a motor vehicle and a disk brake which constitutes a braking system of the motor vehicle are rotatably supported on a knuckle 3 which makes up a suspension system of the motor vehicle by way of a construction shown in FIG. 19 (refer to, for example, Japanese Patent Unexamined Publication No. JP-A-2005-014906). Namely, an outer ring 6 or a stationary ring which makes up a wheel supporting bearing unit 5, which is a target of the invention, is fixed to a circular supporting hole portion 4 formed in the knuckle 3 by fastening a fastening flange 7 which is formed on an outer peripheral surface of the outer ring 6 to the knuckle 3 with not-shown several bolts. A hub 10 which is a rotational member made up of a hub main body 8 and an inner ring 9 is rotatably supported on an inside diameter side of the outer ring 6. This inner ring 9 is fitted on a small-diameter step portion 11 which is formed at a portion of an axially intermediate portion of the hub main body 8 which lies closer to an inner end portion thereof (here, "axially inboard" denotes a portion lying at a center of the vehicle in a width direction when the hub is assembled on to a vehicle, or lying to a right-hand side in each drawing. On the contrary, a left-hand side in each drawing which lies outside of the vehicle in the width direction when the hub is assembled on to the vehicle is denoted by "outer side". This is also true in the specification and the claims of the invention). In addition, an axially inboard end face of the inner ring 9 is held by a clamping portion 12 formed at an axially inner end portion of the hub main body 8, so as to fix the inner ring 9 to the hub main body 8.

In order to rotatably support the hub 10 configured as has been described above on the inside diameter side of the outer ring 6, a plurality of rows of outer ring raceways 13a, 13b are formed on an inner peripheral surface of this outer ring 6. In addition, a plurality of rolling elements 15, 15 are rotatably provided between these two outer ring raceways 13a, 13b and a plurality of rows of inner race raceways 14a, 14b which are formed on, respectively, an outer peripheral surface of the axially intermediate portion of the hub main body 8 and an outer peripheral surface of the inner ring 9, respectively, so that the plurality of rolling elements 15, 15 are allowed to rotate in each of the rows while being retained by each of cages 16, 16. Note that taper rollers may be used as the rolling elements for a wheel supporting bearing unit for a heavy vehicle.

In addition, a mounting flange 17 is formed at a portion of an axially outer end portion of the hub main body 8 which projects from an axially outer end portion opening of the outer ring 6. The wheel 1 and the rotor 2 are fitted on a cylindrical portion 18 provided on the axially outer end portion of the hub main body 8 by loose fit and are fixedly held to an axially outer surface of the mounting flange 17 with a plurality of studs 19 and nuts, not shown.

Additionally, an encoder 20 is fitted on an axially inner end portion of the inner ring 9. Then, the rotational speed of the encoder 20 is made to be detected by a rotational speed detection sensor 22 which is supported on a cover 21 fixed to an axially inner end portion of the outer ring 6. The rotational speed of the hub 10 constituting the rotational ring that is detected by the rotational speed detection sensor 22 is used to control a running state stabilizing system such as an anti-locking brake system (ABS) and a traction control system (TCS).

Note that since the illustrated example is the wheel supporting bearing unit 5 for driven wheels (front wheels of an FR vehicle or RR vehicle, rear wheels of an FF vehicle), the hub main body 8, which makes up the hub 10, is made to be a solid element (substantially cylinder solid). In contrast to this, although not illustrated, as described in the JP-A-2005-014906, in the case of a wheel supporting bearing unit for driving wheels (rear wheels of an FR vehicle or RR vehicle, front wheels of an FF vehicle, all wheels of a 4WD vehicle), a splined hole is formed in a radially central portion of a hub main body, so that a splined shaft of a constant velocity joint is inserted into the splined hole. In addition, an outer ring rotating type wheel supporting bearing unit has conventionally been known in which an inner race does not rotate and an outer ring does rotate.

Incidentally, in recent years, the importance of securing traceability for (ability to find the origin of) products is increasing in various fields for the purposes of securing the safety (reliability) of products, as well as implementing quick countermeasures against drawbacks of products which have already been distributed to the market. To be specific, it is required to secure a means for tracing (or dealing with retrospectively) to obtain (inquire) historical information of history control such as information of production, distribution, maintenance and service, and disposal of the products.

On the other hand, the traceability is conventionally attempted to be secured by stamping the information of production date, production lot and the like on wheel supporting bearing units. To describe specifically, in the event that a defect such as a failure is found in a wheel supporting bearing unit, historical information is obtained (inquired about) on production history for the wheel supporting bearing unit, which is found defective, from information of the production lot or the like which is (part of the historical information) stamped thereon. Then, by utilizing the historical information so obtained, models of the vehicle are specified on which wheel supporting bearing units which are likely to be subjected to the same failure are installed, and a cause of the defect can be investigated, and furthermore, a rectifying treatment can be implemented.

In the case of the method of stamping the required information as described above, however, there is a possibility that the following problems could be caused from the viewpoint of ensuring the traceability of wheel supporting bearing units.

Namely, when stamping information of a wheel supporting bearing unit, stamping needs to be implemented at a location selected as being difficult to be subjected to damage or wear even in use over a long period of time, and hence, since there is imposed a limitation on space where stamping can be implemented, it becomes difficult to stamp much information. In addition, stamping much information within a limited space is troublesome work and requires much time and many manhours, and there is caused a problem with securing the visibility of information so stamped. Due to this, in many cases, information that is to be stamped on wheel supporting bearing units are limited to part of the historical information such as information of production date, production lot and the like. As a result, in order to inquire (find) into detailed historical information such as one on production or assembly plants, repair history or the like based on the limited small amount of information by utilizing, for example, a database inputted in advance into a terminal, not only much time and many manhours are required but also there exists a possibility that no accurate historical information is obtained.

Furthermore, the information of production lot or the like that is stamped on a wheel supporting bearing unit cannot be read directly from the outside of a motor vehicle once the wheel supporting bearing unit is assembled to the vehicle. Due to this, although there occurs an urgent need to verify the information of production lot or the like, the relevant motor vehicle needs to be sent to a repair shop where the wheel supporting bearing unit in question is removed for verification. In addition, in a case where stamping is implemented in an interior of a wheel supporting bearing unit, since disassembling work is required for this wheel supporting bearing unit, much time and many manhours are also required.

SUMMARY OF THE INVENTION

The invention is made in view of the aforesaid situations and an object thereof is to realize a construction which can ensure and facilitate the history control of a wheel supporting bearing unit while attempting to increase the traceability of the wheel supporting bearing unit.

The object of the invention is accomplished by the following configurations.

(1) A wheel supporting bearing unit comprising:
  a stationary ring connected to a vehicle body side and comprising:
    a stationary side peripheral surface; and
    a stationary side raceway on the stationary side peripheral surface;
  a rotational ring connected to a wheel side and comprising:
    a rotational side peripheral surface opposing to the stationary side peripheral surface;
    a rotational side raceway provided on the rotational side peripheral surface, and opposing to the stationary side raceway; and
    a mounting flange to which a wheel is fixed and which is provided at a part of an outer peripheral surface of the rotational ring which lies closer to an axially outer end side;
  a plurality of rolling elements disposed between the stationary side raceway and the rotational side raceway;
  an IC chip which is capable of storing information of the wheel supporting bearing unit; and
  a holding member which holds the IC chip and which is fixedly attached to an axially outer end portion of the rotational ring.

(2) The wheel supporting bearing unit as set forth in (1), wherein the holding member is formed into an annular shape.

(3) A driven wheel supporting bearing unit comprising:
  a stationary member connected to a vehicle body side and comprising:
    a stationary side peripheral surface; and
    a stationary side raceway on the stationary side peripheral surface;
  a rotational member connected to a driven wheel side and comprising:
    a rotational side peripheral surface opposing to the stationary side peripheral surface;
    a rotational side raceway provided on the rotational side peripheral surface, and opposing to the stationary side raceway; and
    a mounting flange to which a wheel is fixed and which is provided at a part of an outer peripheral surface of the rotational member which lies closer to an axially outer end side;
  a plurality of rolling elements disposed between the stationary side raceway and the rotational side raceway; and
  an IC chip which is capable of storing information of the wheel supporting bearing unit.
  wherein the IC chip is directly fixed to a part of the stationary member or rotational member, or is fixed to the rotational member via a member attached to the rotational member.

(4) The wheel supporting bearing unit as set forth in (3), further comprising a cylindrical portion in which the wheel is fitted to an outer peripheral surface thereof,
  wherein the IC chip is fixed to at least a part of the axially outer end portion of the rotational ring which lies radially further inwards than the cylindrical portion or a part of an inner peripheral surface of the cylindrical portion.

(5) The wheel supporting bearing unit as set forth in (3), further comprising:
  a fastening flange which is adapted to be fixed to a suspension system and is provided on an outer peripheral surface of the stationary ring,
  wherein the IC chip is fixed to a portion on the outer peripheral surface of the stationary ring which lies axially offset from the fastening flange.

(6). The wheel supporting bearing unit as set forth in (3), wherein the holding member is a cover that is mounted on an axially inner end portion of the stationary ring, and
  wherein the IC chip is fixed to a part of an axially outer surface of the cover.

(7) The wheel supporting bearing unit as set forth in (3), wherein the holding member is a cover that is mounted on an axially inner end portion of the stationary ring, and wherein the IC chip is fixed to part of an outer peripheral surface of the cover.

(8) The wheel supporting bearing unit as set forth in (3), wherein the holding member is a resin cover that is mounted on an axially inner end portion of the stationary ring via a core metal, and wherein the IC chip is fixed to a part of an inner peripheral surface of the cover which does not overlap with the core metal in the axial direction.

(9) The wheel supporting bearing unit as set forth in (3), wherein the holding member is a resin cover that is mounted on an axially inner end portion of the stationary ring, and wherein the IC chip is molded integrally with the cover.

(10) The wheel supporting bearing unit as set forth in (3), wherein the rotational ring is provided with a cylindrical portion, on which the wheel is fitted, at an axially outer end portion thereof, and
  wherein the holding member is fitted in an inner peripheral surface of the cylindrical portion through interference fit.

(11) The wheel supporting bearing unit as set forth in (3), wherein the rotational ring comprising:
  a cylindrical portion on which a wheel is fitted and which is provided at an axially outer end portion of thereof and
  a splined portion to which a constant velocity joint is mounted and which is provided at an axially intermediate portion of the rotational ring, and
  wherein the holding member is fixed to a flat surface between the cylindrical portion and the splined portion by means of a constant velocity joint mounting nut.

(12) The wheel supporting bearing unit as set forth in (10) or (11), wherein the holding member is formed into an annular shape so that the IC chip is fixed to an inner peripheral surface of the holding member.

(13) The wheel supporting bearing unit as set forth in (10) or (11), wherein the holding member is formed into a bottomed cylindrical shape so that the IC chip is fixed to either an inner peripheral surface of an annular portion or a bottom portion of the holding member.

(14) The wheel supporting bearing unit as set forth in (12) or (13), wherein the holding member is such that the IC ship is molded integrally therewith.

(15) The wheel supporting bearing unit as set forth in any of (3) to (14), wherein a holding recessed portion is provided on a surface of any member of the stationary ring, the rotational ring and the holding member, and wherein the IC chip is fixed in place within the holding recessed portion.

(16) A wheel supporting bearing unit as set forth in any of (3) to (15), wherein the IC chip is combined with an antenna so as to transmit and receive signals via radio communication.

As has been described above, in the case of the wheel supporting bearing units described in (1) or (3), the IC chip which can store information of the wheel supporting bearing unit is fixed to a part of the wheel supporting bearing unit. This IC chip is generally small in size and light in weight and can store more information (in addition to the information of production date and production lot, historical information such as production or assembly plant and repair history) than a case where the information is stamped. In addition, the historical information stored in the IC chip can easily be read by bringing a contact terminal connected to the IC chip into direct contact with an external device such as a reader/writer or by way of radio communication (non-contact) utilizing the antenna as described in (16), either of the methods being able to be utilized as required. Due to this, the inquiring work of obtaining detailed historical information of the wheel supporting bearing unit by utilizing the terminal or the like can be omitted or simplified, thereby making it possible to obtain the detailed historical information within a short period of time and in an accurate fashion. In addition, the troublesome stamping work can also be omitted. As a result, it becomes possible to ensure and facilitate the history control of the wheel supporting bearing unit while increasing the traceability thereof.

According to the aspect described in (1), by including the holding member which holds the IC chip and which is fixed to the axially outer end portion of the rotational ring, the work of reading the historical information stored in the IC chip can be carried out easily without removing the wheel supporting bearing unit from the vehicle. In addition, the removal of the IC chip can also be implemented without removing the wheel supporting bearing unit from the vehicle by removing the holding member from the wheel supporting bearing unit.

When carrying out the invention, as is described in (2) or (12), the holding member is preferably formed into the annular shape. By adopting this configuration, the holding member can be fixed to the hub without interference with another member such as the constant velocity joint fastening nut.

When carrying out the invention, as is described in (4), the cylindrical portion on which the wheel is fitted may be provided at the axially outer end portion of the rotational ring, and the IC chip is fixed to at least the portion of the axially outer end portion of the rotational ring which lies radially further inwards than the cylindrical portion or a part of the inner peripheral surface of the cylindrical portion.

By adopting this configuration, the effect of centrifugal force, which acts in on the IC chip rotating together with the rotational ring when in use, can be suppressed small. This realizes the prevention of fall of the IC chip. In addition, since the IC chip is fixed to the axial outer end portion face of the rotational ring, the work of reading the historical information stored in the IC chip can be implemented without removing the wheel supporting bearing unit from the vehicle.

In addition, when carrying out the invention, as is described in (5), preferably, the fastening flange adapted to be fixed to the suspension system is provided on the outer peripheral surface of the stationary ring, and the IC chip is fixed to the portion on the outer peripheral surface of the stationary ring which lies axially offset from the fastening flange.

Alternatively, as is described in (6), another member is made to constitute the cover that is mounted on the axially inner end portion of the stationary ring. Then, the IC chip is fixed to a part of the axially outer surface of the cover.

Alternatively, as is described in (7), another member is made to constitute the cover that is mounted on the axially inner end portion of the stationary ring. Then, the IC chip is fixed to part of the outer peripheral surface of the cover.

By adopting these configurations, even when driving the vehicle in the rain or the like, the damage of the IC chip can be prevented which would otherwise be caused by the collision of foreign matters such as muddy water and/or small stones which are flung up from the road surface with the IC chip. In addition, since no centrifugal force is applied to the IC chip when in use, as well, the prevention of fall of the IC chip can be accomplished effectively.

Furthermore, as is described in (8), preferably, the holding member is the resin cover that is mounted on the axially inner end portion of the stationary ring via the core metal, and the IC chip is fixed to part of the inner peripheral surface of the cover which does not overlap the core metal in the axial direction.

Alternatively, as is described in (9), the holding member is the resin cover that is mounted on the axially inner end portion of the stationary ring, and the IC chip is molded integrally with the cover.

By adopting this configuration, since the IC chip can be fixed in place within a closed space which is shielded from an external space by the cover. Due to this, also when driving the vehicle in rain, the damage of the IC chip can effectively be prevented which would otherwise be caused by the collision of foreign matters such as muddy water and/or small stones which are flung up from the road surface with the IC chip.

Additionally, when carrying out the invention, as is described under (10), preferably, the cylindrical portion on which the wheel is to be fitted is provided at the axially outer end portion of the rotational ring, and the holding member is fitted in the inner peripheral surface of the cylindrical portion through interference fit.

Alternatively, as is described in (11), the cylindrical portion on which the wheel is fitted is provided at the axially outer end portion of the rotational ring and the splined portion where the constant velocity joint is mounted is provided at the axially intermediate portion of the rotational ring, and the holding member is fixed to a flat surface between the cylindrical portion and the splined portion by means of the constant velocity joint mounting nut.

By adopting these configurations, the IC chip can be fixed strongly and rigidly to the rotational ring which is restricted largely with respect to shape and machining via the holding member, thereby making it possible to accomplish the prevention of damage and fall of the IC chip in an effective fashion.

In addition, when carrying out the invention, preferably, as is described in (13), the holding member is formed into the bottomed cylindrical shape so that the IC chip is fixed to either the inner peripheral surface of the annular portion or the bottom portion of the holding member.

By adopting this configuration, for example, although the holding member needs to be removed temporarily when fastening a nut on a threaded shaft of a constant velocity joint, a fastening torque of the nut can also be surely written on the IC chip by arranging such that the nut cannot be fastened unless the holding member is set in a writing machine of a nut fastening machine.

Furthermore, when carrying out the invention, preferably, as is described in (14), the holding member is such that the IC ship is molded integrally therewith.

By adopting this configuration, the IC chip does not have to be fixed by making use of a separate fixing device, and hence, the IC chip can be set easily.

In addition, when carrying out the invention, preferably, as is described in (15), wherein a holding recessed portion is provided on the surface of any member of the stationary ring, the rotational ring and the holding member, and the IC chip is fixed in place within the holding recessed portion.

By adopting this configuration, not only the damage of the IC chip can be prevented, but also the degree of freedom can be increased with respect to place where the IC chip is mounted.

Furthermore, when carrying out the invention, preferably, as is described in (16), the antenna is combined with the IC chip so as to transmit and receive signals (and power) by way of radio communication.

By adopting this configuration, the historical information stored in the IC chip can be read in a non-contact fashion by way of radio communication utilizing an external device such as a reader/writer which includes an antenna. Due to this, the work of reading the historical information stored in the IC chip can be implemented without removing the wheel supporting bearing unit from the vehicle. In addition, even in a case where the IC chip (and the antenna) is fixed in place in the interior of the wheel supporting bearing unit, work of disassembling the wheel supporting bearing unit is made unnecessary. Note that in case an external device having an anti-collision function (a collision preventing function) is used as the external device, information stored in a plurality of IC chips which are fixed, respectively, to all the wheel supporting bearing units that are assembled to the vehicle can be read simultaneously, for example.

In addition, an IC tag which utilizes an RFID (radio frequency identification) technology is widely known as a construction in which an IC chip is combined with an antenna which implements the transmission and reception of signals by way of radio communication (refer to FIG. 2). Due to this, hereinafter, constructions in which an IC chip is combined with an antenna will be represented by and referred to simply as an IC tag.

DETAILED DESCRIPTION OF THE PREFERRED EMBODIMENTS

First Embodiment

Figure 1:
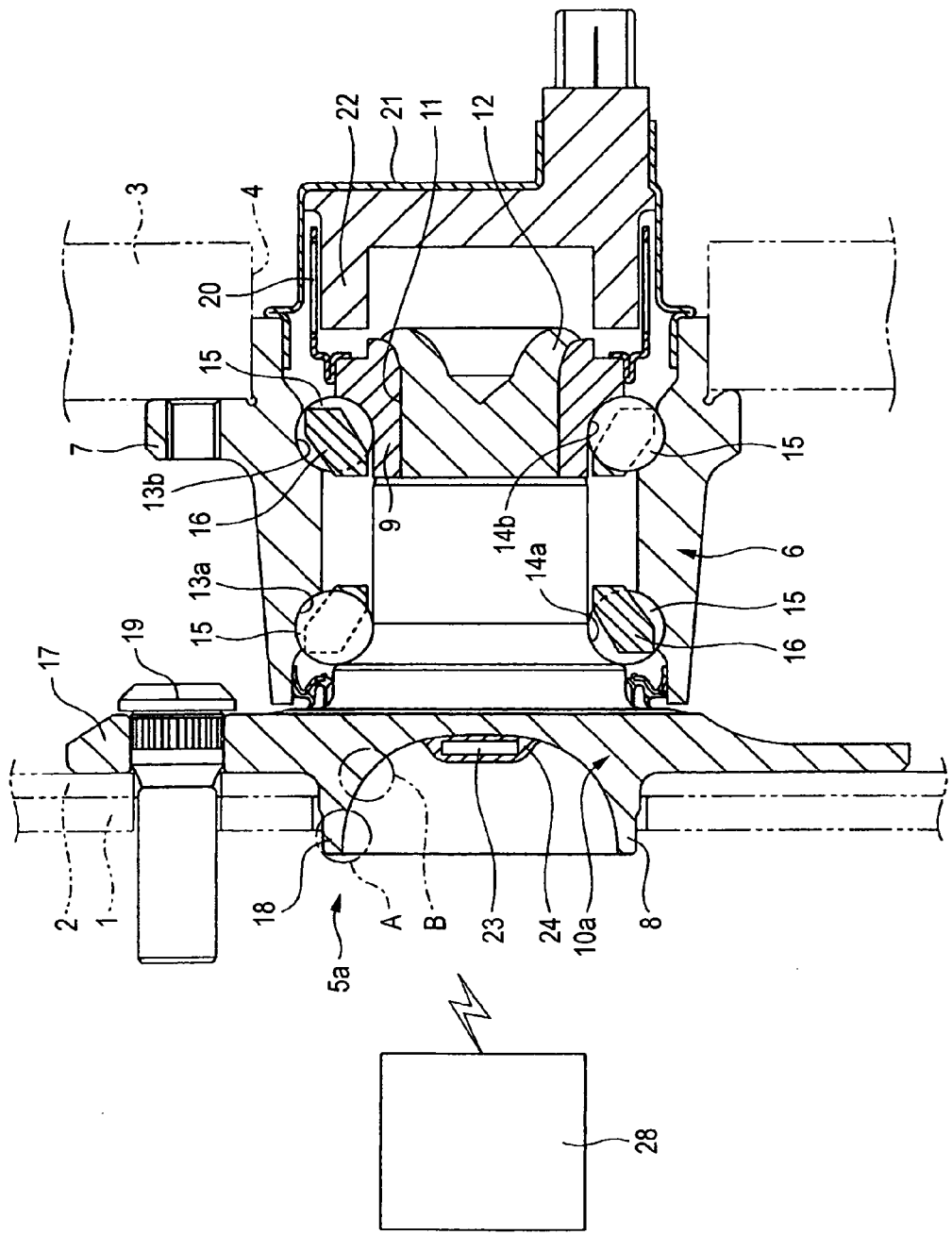
FIG. 1 is a sectional view showing a wheel supporting bearing unit according to a first embodiment of the invention.
Figure 2:
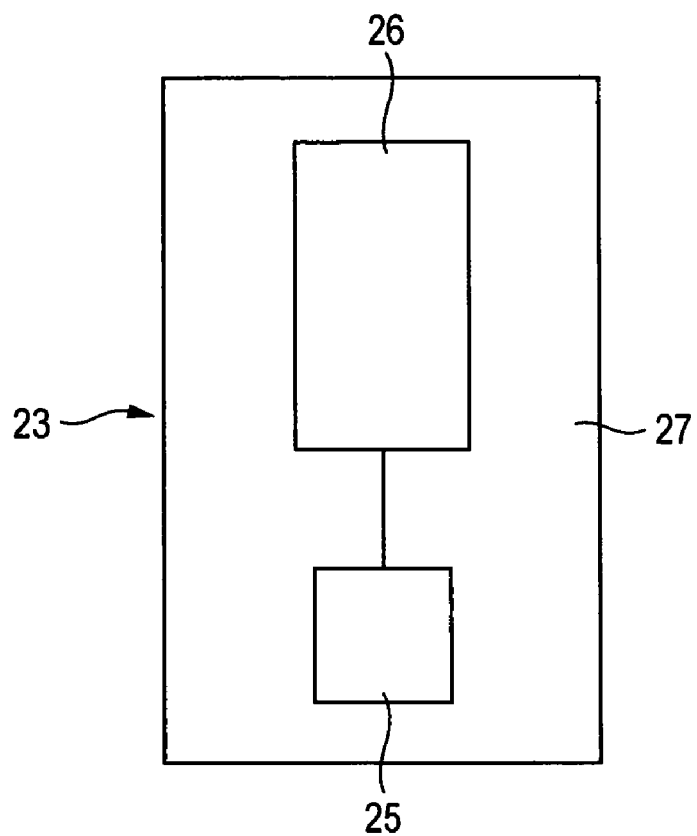
FIG. 2 is an exemplary diagram showing a general IC tag that is used in the invention.
Figure 19:
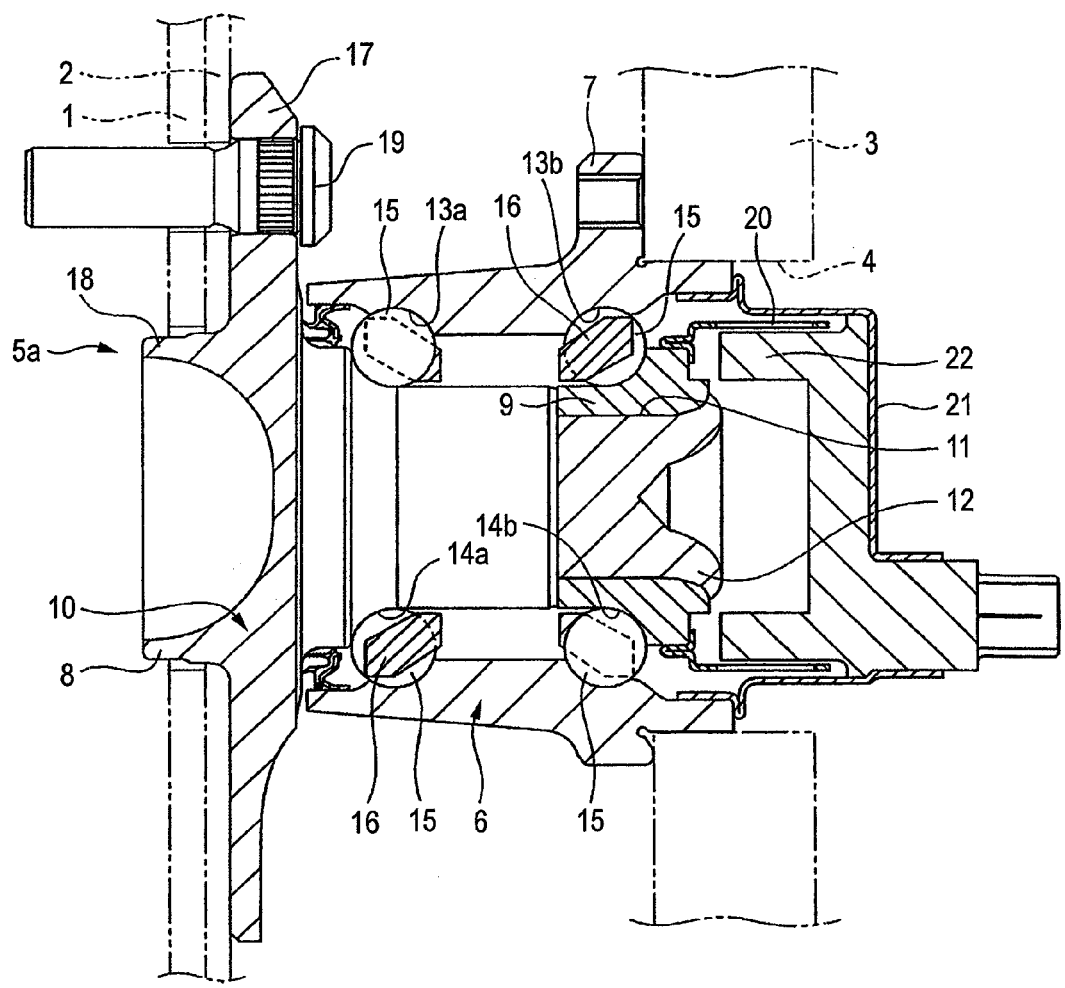
FIG. 19 is a sectional view showing an example of a wheel supporting bearing unit of a conventional construction.

FIGS. 1 to 2 show a wheel supporting bearing unit according to a first embodiment of the invention. Note that a feature of the invention resides in a point where the traceability of a wheel supporting bearing unit 5a is increased by fixing an IC tag 23 to part of the wheel supporting bearing unit 5a. The other construction of this wheel supporting bearing unit 5a, as well as constructions and functions of other portions thereof are similar to those of the conventional construction shown in FIG. 19. Due to this, omitting or simplifying the repetition of similar descriptions, characteristic portions of the embodiment will mainly be described. Note that herein, the IC tag 23 is illustrated larger than its actual dimensions.

As shown in FIG. 1, in the case of the first embodiment, the IC tag 23 is caused to fixedly adhere to a central portion on an axially outer end portion face of a hub 10a, which is a rotational member making up the wheel supporting bearing unit 5a, with an adhesive 24. Note that the rotational member for driven wheel supporting bearing unit is substantially cylinder solid. In addition, the whole of a surface of the IC tag 23 is covered by this adhesive 24. Due to this, the IC tag 23 is fixed to the central portion on the axially outer end portion face of the hub 10a without its surface being exposed to an external space. As its basic configuration is shown in FIG. 2, the IC tag 23 is made up of an IC chip 25 and an antenna 26, which are fixed (connected) to an IC tag substrate 27. Of these, the IC chip 25 is small in size and is formed, in general, into a square shape with its side being 1 mm or shorter and includes at least a memory for storing information. In addition, the antenna 26 is normally such as to be formed into a coil shape and is used to implement the transmission and reception of signals via radio waves (radio communication) with an external device 28 (refer to FIG. 1) such as a reader/writer having an antenna or the like.

In this embodiment, historical information (as character data, or converted into ID data) on the wheel supporting bearing unit 5a is stored in the IC tag 23 (specifically, the memory in the IC chip 25) that is configured as has been described above. To be specific, various types of information of the wheel supporting bearing unit 5a are selected to be so stored, the information including production date, production lot, production plant, repair history (replacement history), projection number, people in charge of design, production and quality control, material of each constituent member, machining method, assembling method, result of quality inspection, distribution route and the like.

The aforesaid external device 28 placed in an external space of a vehicle (or may be a portable type) is used to read the historical information stored in the IC tag 23. To describe specifically, a non-contact radio communication is implemented between the external device 28 and the IC tag 23, so that the historical information stored in the IC tag 23 is transmitted to the external device 28 side. Then, the historical information so transmitted is displayed on, for example, a display of a terminal, not shown, which is connected to the external device 28.

By adopting the configuration like this, the inquiring work that is to be carried out to obtain the detailed historical information of the wheel supporting bearing unit 5a by utilizing the terminal can be omitted or simplified. Due to this, the detailed historical information of the wheel supporting bearing unit 5a can be obtained within a short period of time and in an accurate fashion. In addition, the work of reading the historical information stored in the IC tag 23 can be performed without removing the wheel supporting bearing unit 5a from the vehicle. As a result, the history control of the wheel supporting bearing unit 5a can be ensured and facilitated while increasing the traceability of the wheel supporting bearing unit 5a.

In particular, in the case of this embodiment, by setting the mounting position of the IC tag 23 to the central portion on the axially outer end portion face of the hub 10a, the following advantages can be obtained.

Firstly, a distance between the IC tag 23 and the external device 28 can be made short, and a shielding element that is to be provided between the external device 28 and the IC tag 23 can be limited to a wheel cover only, not shown. Due to this, a radio communication between the IC tag 23 and the external device 28 can be implemented in an ensured fashion.

Secondary, the effect of a centrifugal force applied to the IC tag 23 which rotates together with the hub 10a is suppressed to a small amount. Namely, by fixing the IC tag 23 to the radially central portion on the axially outer end portion face of the hub 10a, a distance from the rotational center of the hub 10a is made short so as to suppress the centrifugal force applied to the IC tag 23 to a small amount. Due to this, the fall of the IC tag 23 from the hub 10a can be prevented effectively.

Furthermore, in this embodiment, as has been described before, by covering the whole surface of the IC tag 23 by the adhesive 24, even when driving the vehicle in the rain or the like, muddy water or the like is prevented from adhering directly to the IC tag 23. Due to this, the damage of the IC tag 23 can be prevented effectively.

Note that in this embodiment, while the IC tag 23 has been described as being fixed to the central portion on the axially outer end portion face of the hub 10a, the IC tag 23 can also be fixed to an inner peripheral surface portion (a portion A shown by a chain line in FIG. 1) of a cylindrical portion 18 provided at an axially outer end portion of the hub 10a where the similar functions and advantages can be obtained. As this occurs, the centrifugal force applied to the IC tag 23 when in use is borne by the inner peripheral surface portion of the cylindrical portion 18, whereby the prevention of fall of the IC tag 23 can be attained. In addition, the IC tag 23 can also be fixed to a portion (a portion B indicated by a chain line in FIG. 1) between the central portion on the axially outer end portion face of the hub 10a and the inner peripheral surface portion of the cylindrical portion 18.

Figure 3:
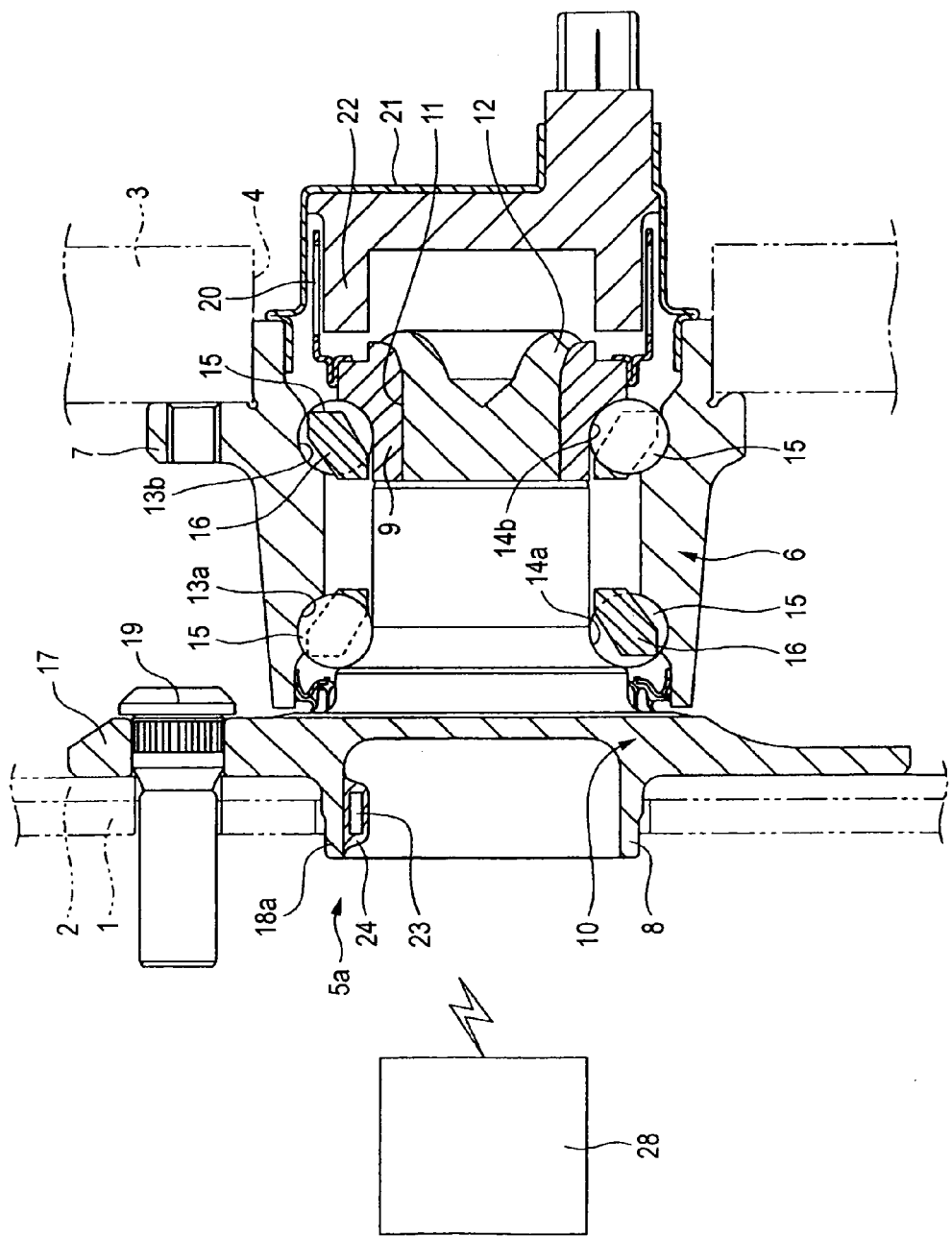
FIG. 3 is a sectional view showing a wheel supporting bearing unit according to a modified example to the first embodiment.

In addition, as a modified example to this embodiment, as shown in FIG. 3, an inner peripheral surface portion of a cylindrical portion 18a provided at the axially outer end portion of the hub 10a is formed into a straight shape in cross section, so that the IC tag 23 may be fixed to the inner peripheral surface portion so formed.

Furthermore, the arrangement of the IC tag 23 that is fixed to the inner peripheral surface portion of the cylindrical portion 18 of this embodiment can also be applied to a wheel supporting bearing unit for driving wheels, which will be described later on.

Second Embodiment

Figure 4:
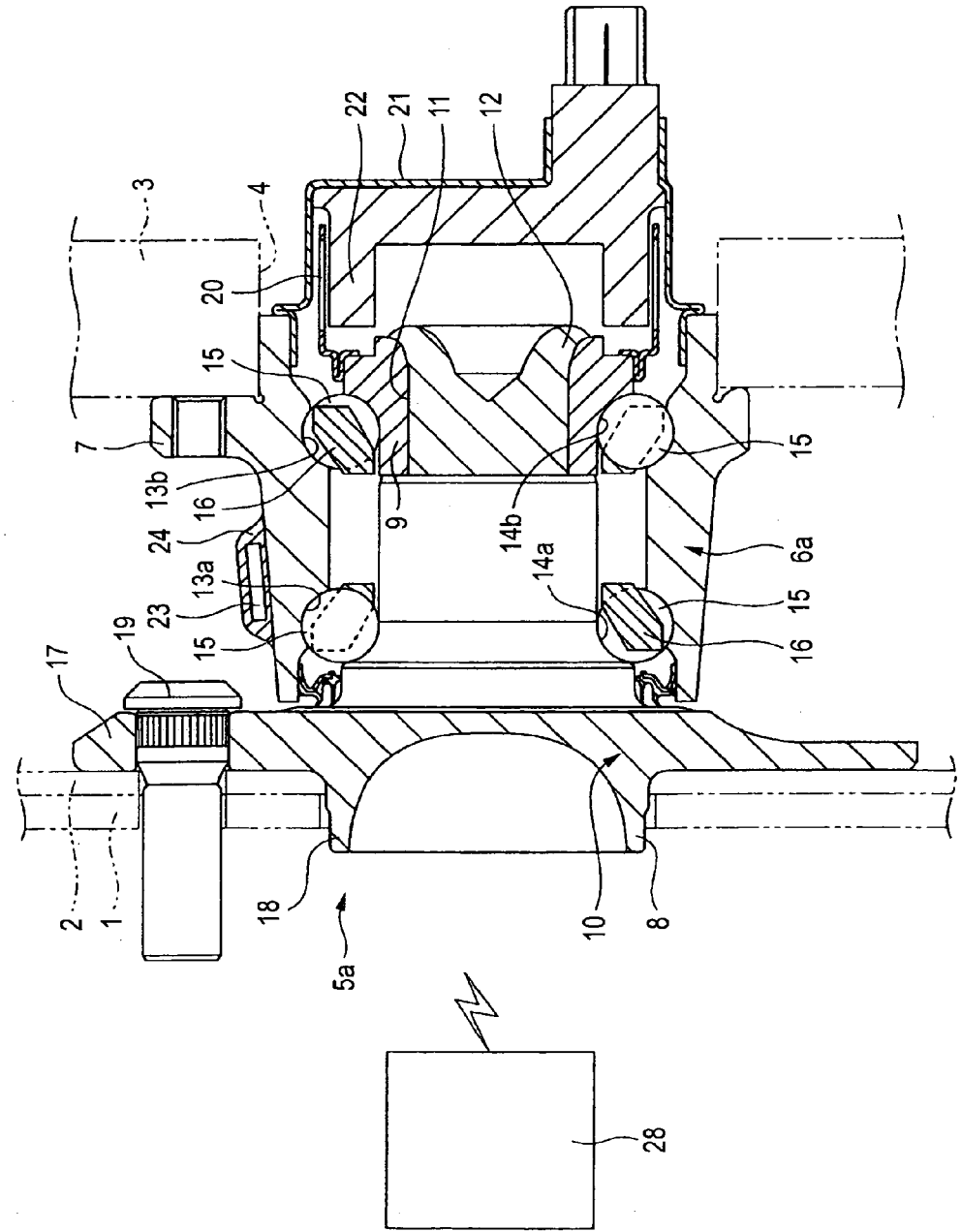
FIG. 4 is a sectional view showing a wheel supporting bearing unit according to a second embodiment of the invention.

FIG. 4 shows a wheel supporting bearing unit according to a second embodiment of the invention. In this embodiment, an IC tag 23 is caused to fixedly adhere to a portion on an outer peripheral surface of an outer ring 6a which is a stationary ring which lies offset axially outwards from a fastening flange 7 adapted to be fixed to a suspension system by utilizing an adhesive 24. In addition, in the case of the embodiment, the mounting position of the IC tag 23 on the outer peripheral surface of the outer ring 6a is set to a location (an upper surface side) thereof which lies substantially opposite to a road surface side (a lower side in FIG. 4) of the outer peripheral surface of the outer ring 6a in such a state that the wheel supporting bearing unit is assembled to a motor vehicle.

By adopting this configuration, even when driving the vehicle in the rain or the like, the damage of the IC tag 23 can be prevented effectively which would otherwise be caused by virtue of the collision of foreign matters such as muddy water and/or small stones which are flung up from the road surface with the IC tag 23. In addition, in this embodiment, since the IC tag 23 is fixed to the outer ring 6a which constitutes the stationary ring, no centrifugal force is applied to the IC tag 23. Due to this, the prevention of fall of the IC tag 23 can be accomplished effectively.

Note that in this embodiment, with the wheel supporting bearing unit assembled to the vehicle, shielding elements such as at least a wheel which constitutes a road wheel of the vehicle and a rotor 2 are interposed between the IC tag 23 and an external device 28. Due to this, there exists a possibility that an accurate radio communication cannot be implemented between the external device 28 and the IC tag 23 in the existing circumstances. Consequently, in order to read historical information stored in the IC tag 23 accurately, the external device 28 (of a portable type) is preferably made to approach the IC tag 23. The other configurations and functions of this embodiment are similar to those of the first embodiment.

Third Embodiment

Figure 5:
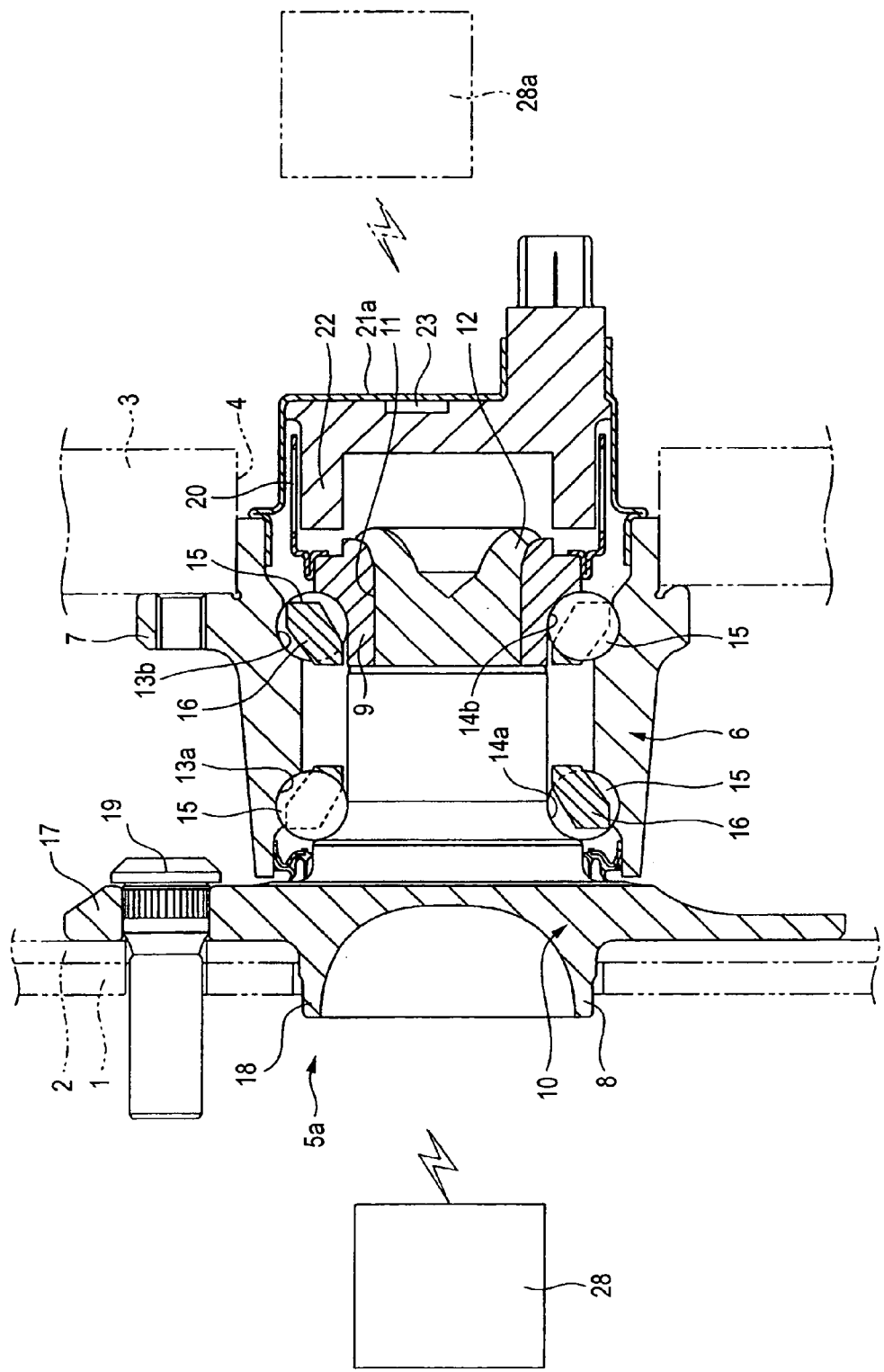
FIG. 5 is a sectional view showing a wheel supporting bearing unit according to a third embodiment of the invention.

FIG. 5 shows a wheel supporting bearing unit according to a third embodiment of the invention. In the case of this embodiment, an IC tag 23 is fixed to an axially outer surface of a cover 21a which is fixedly fitted in an axially inner end portion of an outer ring 6 which constitutes a stationary ring.

By adopting this configuration, the IC tag 23 can be fixed in place within a closed space which is shielded from an external space by the cover 21a. Due to this, even when driving the vehicle in the rain or the like, the damage of the IC tag 23 can be prevented effectively which would otherwise be caused by virtue of the collision of foreign matters such as muddy water and/or small stones which are flung up from the road surface with the IC tag 23. In addition, since no centrifugal force is applied to the IC tag 23, the prevention of fall of the IC tag 23 can be accomplished effectively. The other configurations and functions are similar to those of the second embodiment that has just been described above and the first embodiment that has been described before.

Note that by combining the IC tag 23 with a rotational speed detection sensor 22 supported on the cover 21a, a detection signal of the rotational speed detection sensor 22 (and power) can be transmitted to a control unit having a data receiving machine 28a which is provided on a vehicle body side through wireless communication. By adopting this configuration, a disconnection of a wiring harness, not shown, which connects the control unit provided on the vehicle body side with the rotational speed detection sensor 22 can be prevented, and moreover, the wiring harness itself and hence work of laying out the wiring harness can be omitted.

Figure 6:
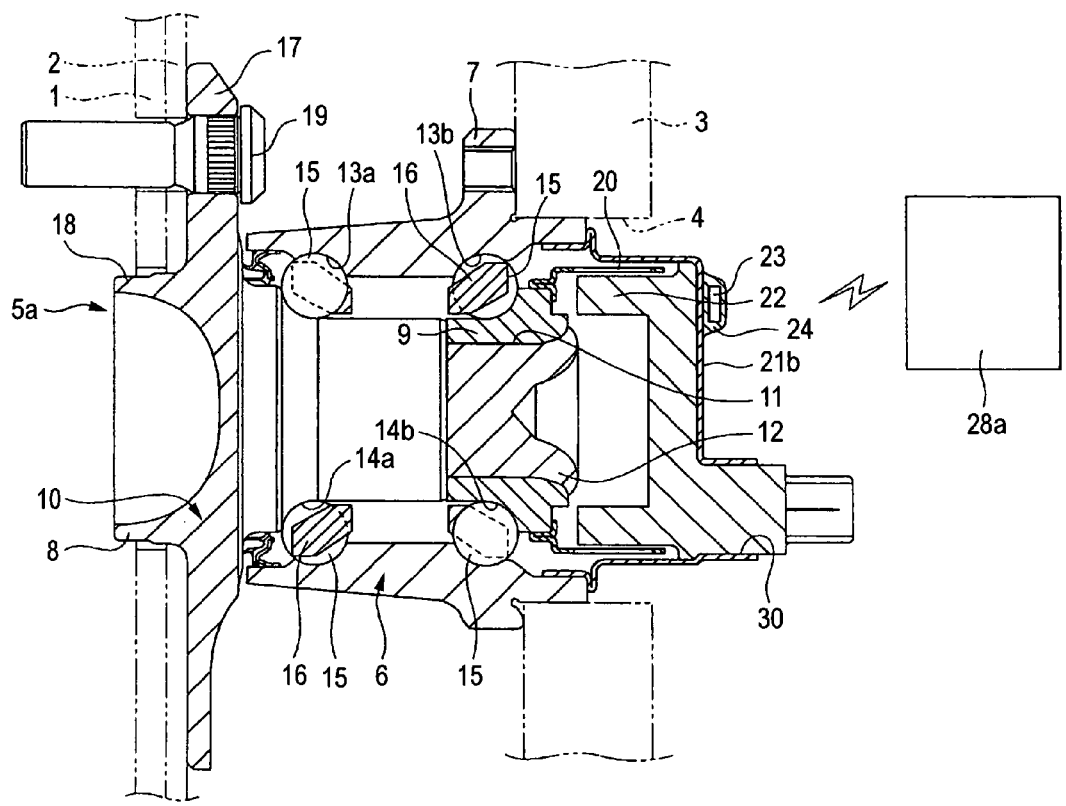
FIG. 6 is a sectional view showing a wheel supporting bearing unit according to a modified example to the third embodiment.

In addition, as a modified example to this embodiment, the IC tag 23 may be fixed with the adhesive 24 to an axially inboard surface of a cover 21b which is fixedly fitted in the outer ring 6 which constitutes the stationary ring at a position which lies symmetrically with a sensor hole 30 as shown in FIG. 6 or in the vicinity of the sensor hole 30.

By adopting this configuration, when transmitting historical information from the IC tag 23 and a detection signal of the rotational speed detection sensor 22 to the data receiving machine 28 which is provided on the vehicle body side via wireless communication, not only the wiring harness itself and the work of laying out the wiring harness can be omitted, but also the detection can be facilitated.

Fourth Embodiment

Figure 7:
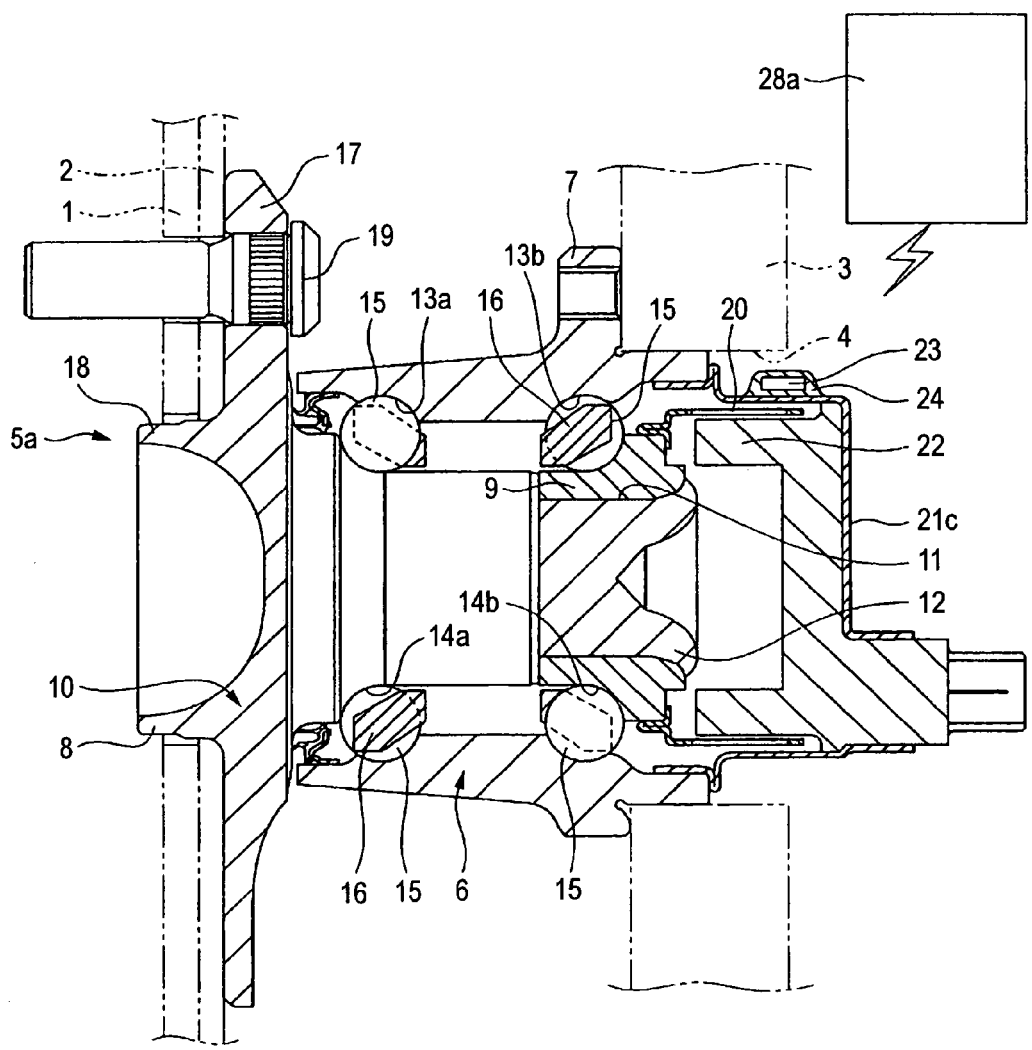
FIG. 7 is a sectional view showing a wheel supporting bearing unit according to a fourth embodiment of the invention.

FIG. 7 shows a wheel supporting bearing unit according to a fourth embodiment of the invention. In the case of this embodiment, an IC tag 23 is fixed to an outer peripheral surface of a cover 21c which is fixedly fitted in an axially inner end portion of an outer ring 6 which constitutes a stationary ring, and historical information is designed to be read by means of a data receiving machine 28a which is provided on a vehicle body side.

By adopting this configuration, the IC tag 23 can be mounted on the cover 21c even in the event that it is difficult to mount the IC tag 23 on an axially inboard side of the cover 21c or in the event that the position of the external device 28a lies away from a central portion of the cover 21c, whereby historical information can be read in an ensured fashion. The other configurations and functions of this embodiment are similar to those of the third embodiment that has been described before.

Note that in this embodiment, too, the mounting position of the IC tag 23 on the outer peripheral surface of the cover 21c is set to a location (an upper surface side) thereof which lies substantially opposite to a road surface side (a lower side in FIG. 7) of the outer peripheral surface of the cover 21c in such a state that the wheel supporting bearing unit is assembled to a motor vehicle. By adopting this configuration, even when driving the vehicle in the rain or the like or the like, the damage of the IC tag 23 can be prevented effectively which would otherwise be caused by virtue of the collision of foreign matters such as muddy water and/or small stones which are flung up from the road surface with the IC tag 23. In addition, since no centrifugal force is applied to the IC tag 23 which is fixed to the cover 21c, the prevention of fall of the IC tag 23 can be accomplished effectively.

Figure 8:
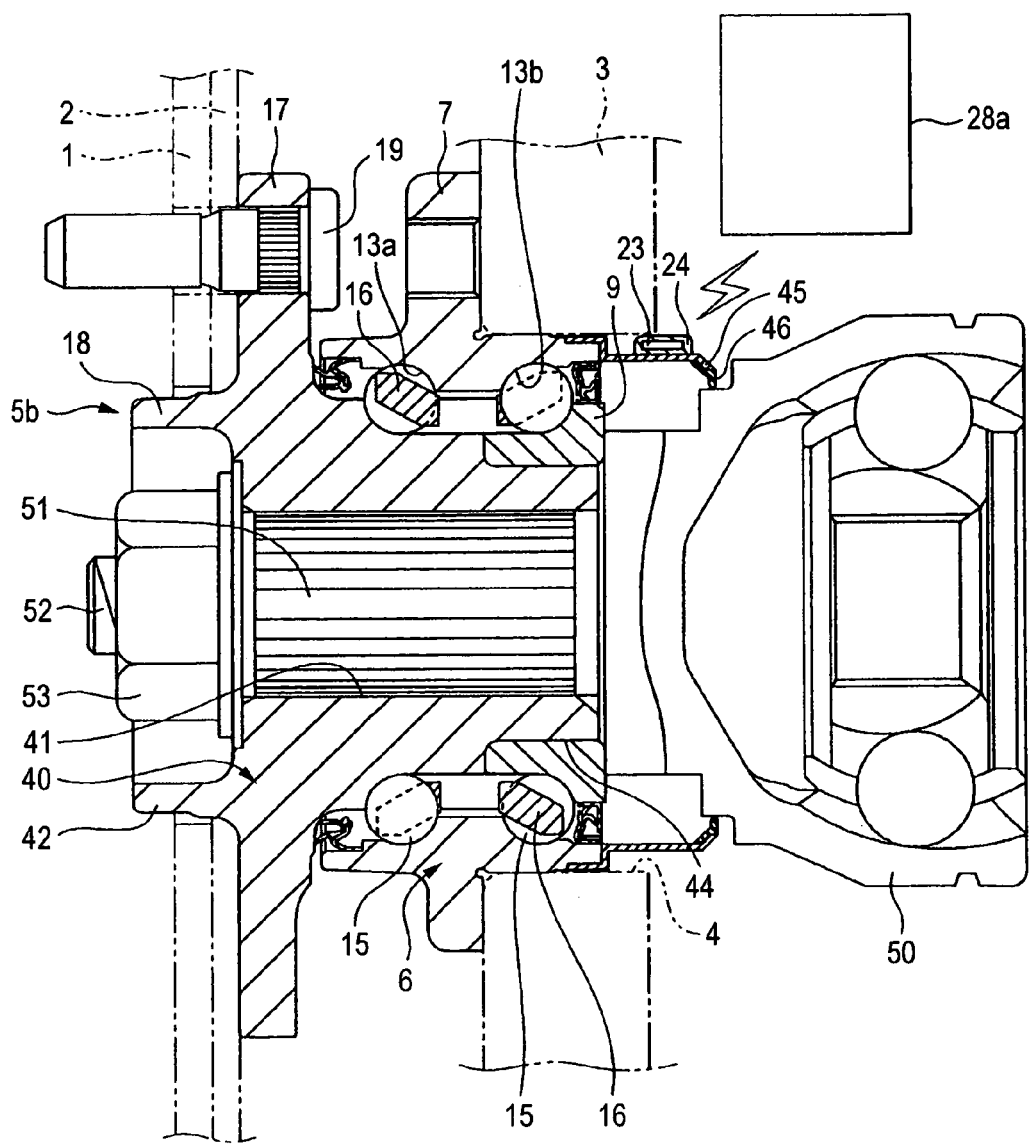
FIG. 8 is a sectional view showing a wheel supporting bearing unit according to a modified example to the fourth embodiment.

In addition, as a modified example to this embodiment, the arrangement of the IC tag 23 like this is preferable for a wheel supporting bearing unit for driving wheels (rear wheels of an FR vehicle and an RR vehicle, front wheels of a FF vehicle, and all wheels of a 4WD vehicle) in which a constant velocity joint is provided as shown in FIG. 8.

In the case of a wheel supporting bearing unit for driving wheels, a hub 43, acting as a rotational ring, which is made up of a hollow hub main body 42 in which a splined hole 41 is formed at a central portion thereof and an inner ring 9 is rotatably supported on an inside diameter side of an outer ring 6. That is, the rotational member for the driving wheel is ring shaped. A splined shaft 51 of a constant velocity joint 50 is inserted into the splined hole 41 of the hub main body 42, and a constant velocity joint mounting nut 53 is screwed on a threaded portion 52 formed on a distal end of the splined shaft 51 within a cylindrical portion 18 of the hub main body 42, whereby the constant velocity joint 50 is fixed to the hub 43 in such a state that the inner ring 9 fitted on a small diameter step portion 44 is brought into abutment with an external surface of an intermediate portion. The constructions of the other portions to which like reference numerals to those of the wheel supporting bearing unit for driven wheels are imparted are basically similar to the constructions of those of the wheel supporting bearing unit for driven wheels.

In this case, the IC tag 23 is fixed with an adhesive 24 to an outer peripheral surface of a cover 45 which is fixed to an axially inner end portion of the outer ring 6, and historical information is read by a data receiving machine 28a provided on the vehicle body side, whereby in the wheel supporting bearing unit for driving wheels, even in the event that the IC tag 23 needs to be mounted on an axially inboard side thereof, the IC tag 23 can be so placed, thereby making it possible to ensure the reading of data.

In addition, a seal lip 46 is provided at a distal end portion of the cover 45 in such a manner as to be in sliding contact with an outer peripheral surface of the constant velocity joint 50, so as to increase the sealed condition of a bearing space where the rolling elements are disposed.

Fifth Embodiment

Figure 9:
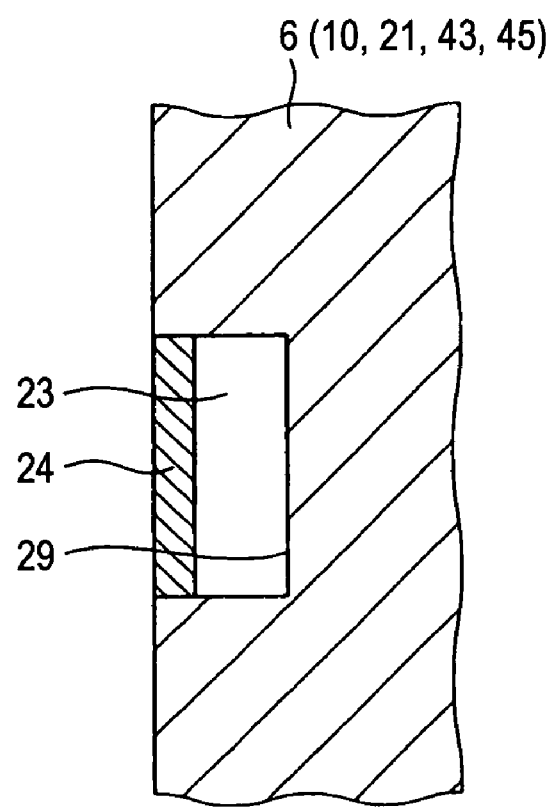
FIG. 9 is a sectional view showing a wheel supporting bearing unit according to a fifth embodiment of the invention.

FIG. 9 shows a wheel supporting bearing unit according to a fifth embodiment of the invention. In the case of this embodiment, an IC tag 23 is fixed to any of an outer ring 6 which constitutes a stationary ring, a hub 10, 43 which constitutes a rotational ring and a cover 21, 45 and the like which constitutes another member by being brought into mechanical engagement with a holding recessed portion 29 provided on a surface of any of the aforesaid members. In addition, by filling this holding recessed portion 29 with an adhesive 24 in such a state that the IC tag 23 is fixed within the holding recessed portion 29, not only minute gaps between the holding recessed portion 29 and the IC tag 23 are filled but also the whole of a surface of the IC tag 23 is covered with the adhesive 24.

By adopting this configuration, not only the prevention of damage and falling of the IC tag 23 can be accomplished effectively but also the degree of freedom with respect to the mounting position of the IC tag 23 can be increased. Namely, the IC tag 23 can be fixed to a surface which abuts a mating member in such a state that the wheel supporting bearing unit is assembled to the vehicle by providing the holding recessed portion 29. The other configurations and functions of this embodiment are similar to those of the first to fourth embodiments that have been described heretofore.

Sixth Embodiment

Figure 10:
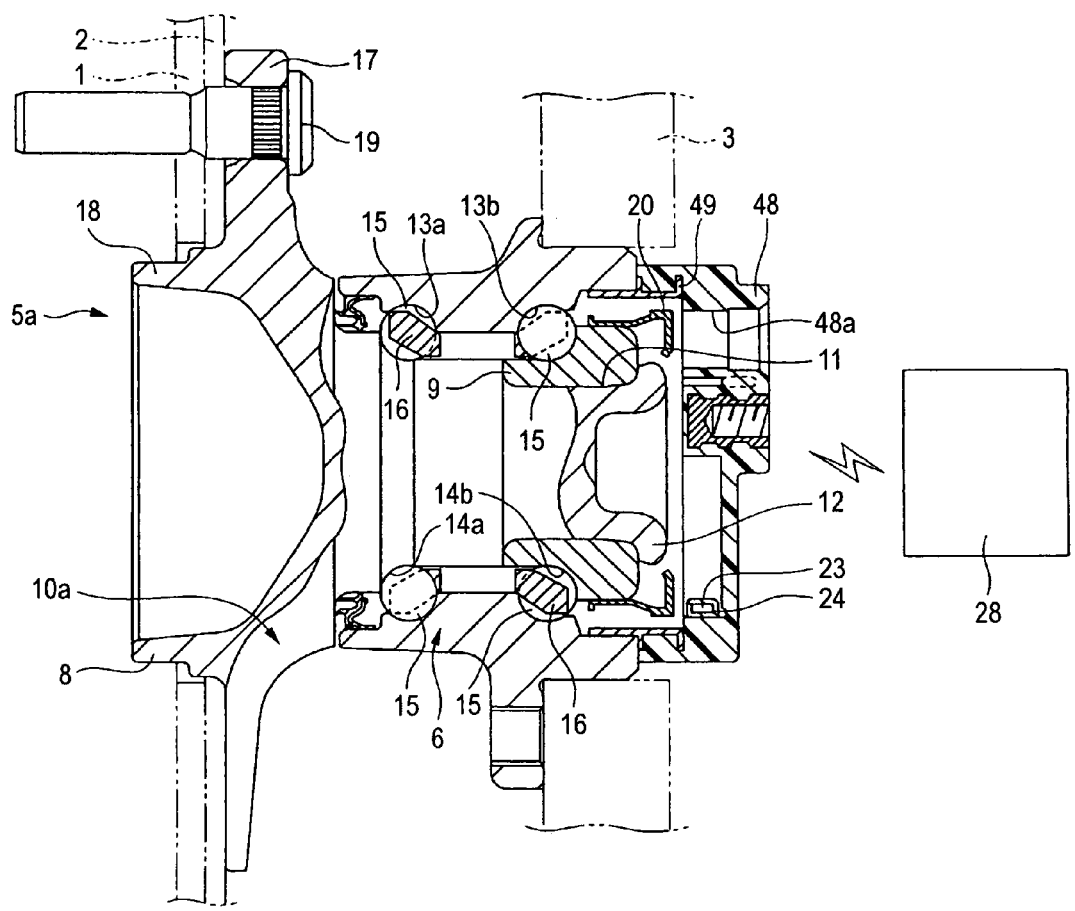
FIG. 10 is a sectional view showing a wheel supporting bearing unit according to a sixth embodiment of the invention.

FIG. 10 shows a wheel supporting bearing unit according to a sixth embodiment of the invention. In the case of this embodiment, an IC tag 23 is fixed to an inner peripheral surface of a resin cover 48 which is fixed to an axially inner end portion of an outer ring 6 which constitutes a stationary ring via a core metal 49. The core metal 49 which extends towards an axial end is molded integrally with the cover 48, and the core metal 49 is fixedly fitted in an inner peripheral surface of the axially inner end portion of the outer ring 6. In addition, the cover 48 is formed into a bottomed cylindrical shape, and a sensor hole 48a is formed in part of a bottom portion which faces an encoder 20. Furthermore, the IC tag 23 is mounted via an adhesive on the inner peripheral surface of the cover 48 at a position which does not overlap the core metal 49 in the axial direction.

Historical information of the IC tag 23 is read by a data receiving machine 28a that is provided on a vehicle body side. Note that as with the embodiments that have already been described before, the historical information from the IC tag 23 may be combined with a detection of a rotational speed detection sensor, not shown, which is mounted in the sensor hole 48a so as to be read together by the data receiving machine 28a.

By adopting this configuration, the IC tag 23 can be fixed in place within a closed space which is shielded from an external space by the cover 48. Due to this, even when driving the vehicle in the rain or the like, the damage of the IC tag 23 can be prevented effectively which would otherwise be caused by virtue of the collision of foreign matters such as muddy water and/or small stones which are flung up from the road surface with the IC tag 23. The other configurations and functions of this embodiment are similar to those of the first to fifth embodiments that have already been described before.

Figure 11:
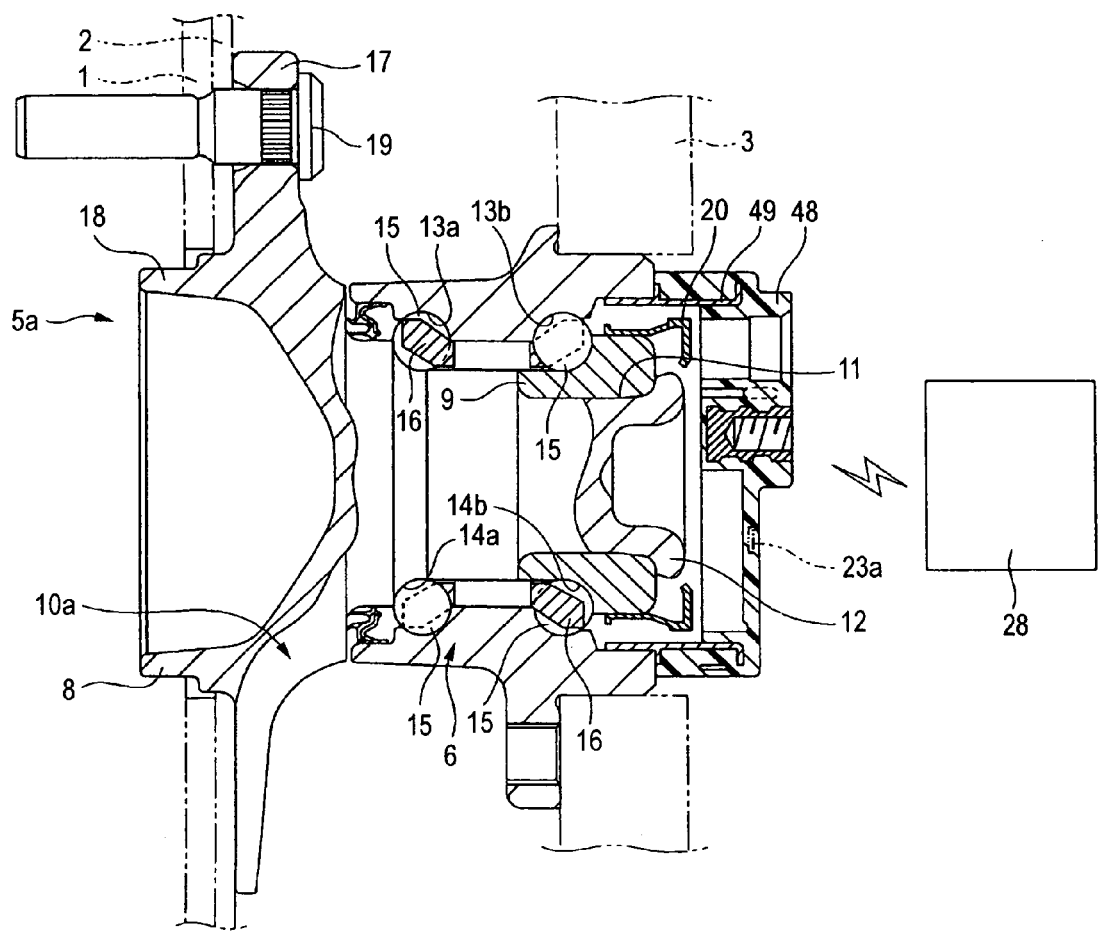
FIG. 11 is a sectional view showing a wheel supporting bearing unit according to a modified example to the sixth embodiment.

In addition, FIG. 11 shows a wheel supporting bearing unit according to a modified example to this embodiment. In this modified example, an IC tag 23 is molded integrally with a resin cover 48 in such a manner that the IC tag 23 is surrounded by the resin cover 48 at a cylindrical portion thereof.

In this case, too, even when driving the vehicle in the rain or the like, the damage of the IC tag 23 can be prevented effectively which would otherwise be caused by virtue of the collision of foreign matters such as muddy water and/or small stones which are flung up from the road surface with the IC tag 23. In addition, the IC tag 23 does not have to be fixed by making use of a separate fixing means such as an adhesive and hence can be set easily. Note that the resin cover 48 may be formed integrally with an IC tag 23a through molding in such a manner as to surround the IC tag 23a at a bottom portion of the cover 48.

Seventh Embodiment

Figure 12:
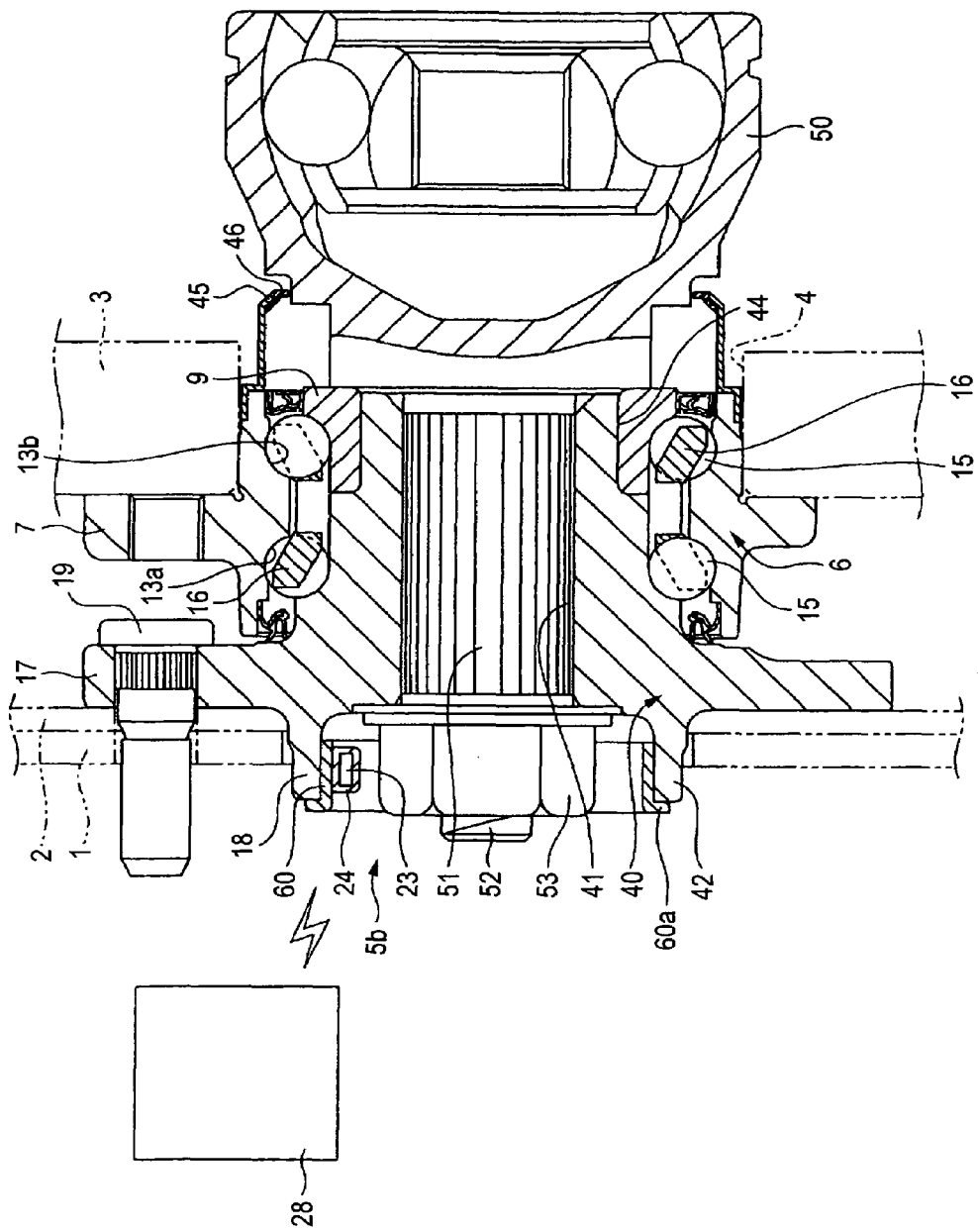
FIG. 12 is a sectional view showing a wheel supporting bearing unit according to a seventh embodiment of the invention.

FIG. 12 shows a wheel supporting bearing unit according to a seventh embodiment of the invention. In the case of this embodiment, a holding member 60 for holding an IC tag 23 is fixed to an axially outer end portion of a hub 40 which constitutes a rotational ring so as to accomplish an increase in traceability of a wheel supporting bearing unit 5b. The overall construction of this wheel supporting bearing unit 5b, as well as constructions and functions of other portions thereof are similar to those of the wheel supporting bearing unit for driving wheels which has been described before as the modified example to the fourth embodiment. Due to this, like reference numerals are imparted to like portions of this embodiment, so as to omit or simplify the repetition of similar descriptions.

In the case of this embodiment, the holding member 60 which holds the IC tag 23 has a flange 60a at an axial end portion thereof and is formed into an annular shape, and an outer peripheral surface of the holding member 60 is fitted in an inner peripheral surface of a cylindrical portion 18 of a hub main body 42 through interference fit until the flange 60a is brought into abutment with an axially outer end portion face of the cylindrical portion 18. In addition, while the IC tag 23 is fixed to an inner peripheral surface of the holding member 60 with an adhesive 24, the holding member 60 may be made from resin so as to be molded together with the IC tag 23 in such a manner as to surround the IC tag 23.

In the wheel supporting bearing unit 5b for driving wheels, a nut 53 for fastening a constant velocity joint 50 to the hub 40 needs to be provided at an axially outer end portion of the hub 40. As this occurs, however, being different from the case with the wheel supporting bearing unit 5a for driven wheels, the IC tag 23 cannot be disposed in the vicinity of a center line of the hub 40 where no centrifugal force is applied. In this case, the IC tag 23 needs to be fixed strongly and rigidly to a flat portion which lies away from the center line of the hub 40 or the inner peripheral surface of the cylindrical portion 18 which is liable to centrifugal force, but the cylindrical portion 18 is largely restricted with respect to its shape and the way of machining.

Consequently, after the IC tag 23 is fixed to the holding member 60 in the way described above, the holding member 60 is fitted in the cylindrical portion 18 of the hub main body 42 through interference fit, whereby the IC tag 23 can be fixed strongly and rigidly, and the prevention of damage and fall of the IC tag 23 can be accomplished effectively. In addition, since the holding member 60 is formed into the annular shape, the holding member 60 is fixed to the hub 40 without interfering with the nut 53. The other configurations and functions of this embodiment are similar to those of the first to sixth embodiments that have been described before.

Figure 13:
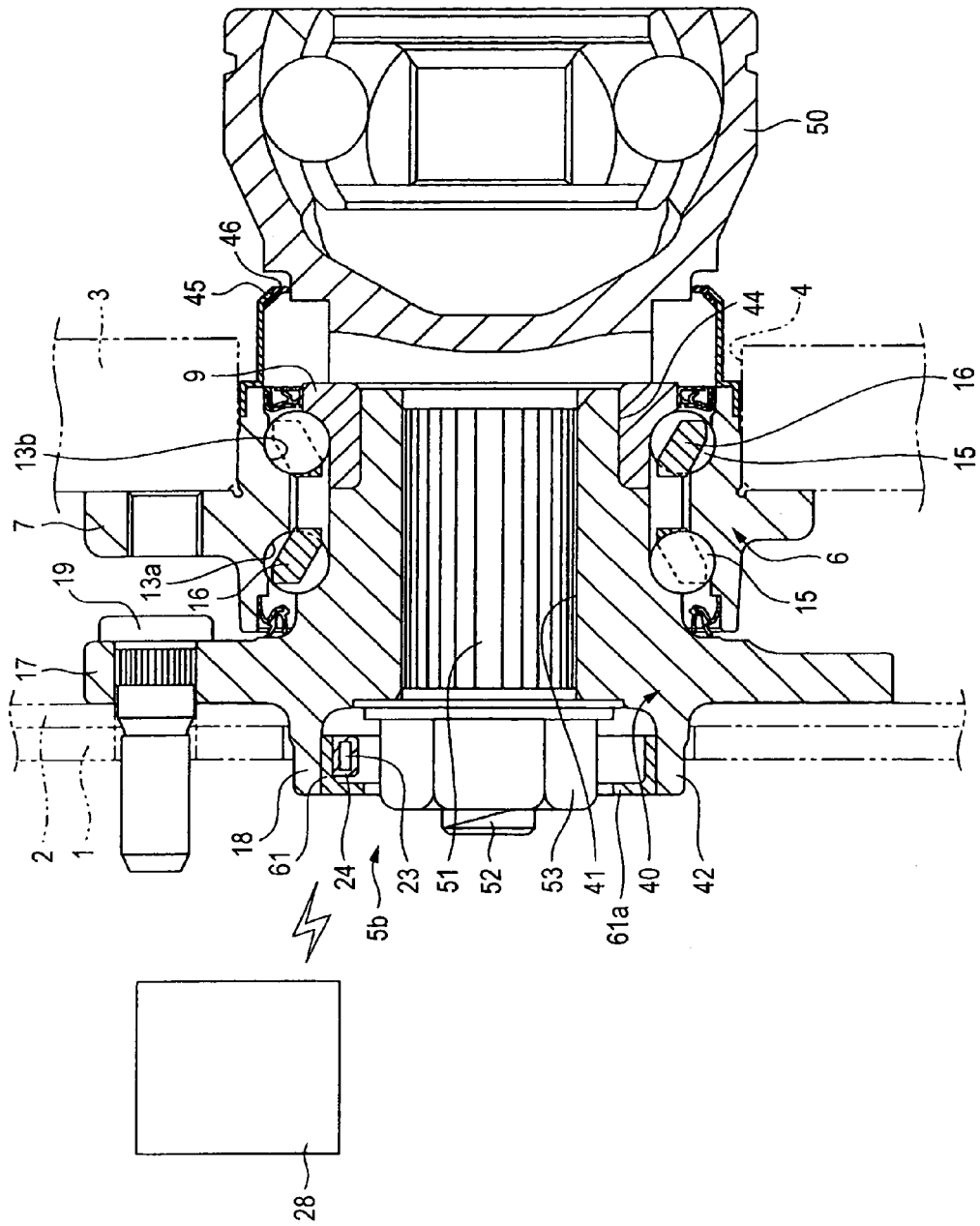
FIG. 13 is a sectional view showing a wheel supporting bearing unit according to a modified example to the seventh embodiment.

In addition, as a modified example to this embodiment, as shown in FIG. 13, a holding member 61 may have a flange 61a which extends radially inwards at an axially outer end portion thereof and be formed into an annular shape, and the holding member 61 may be fitted in the inner peripheral surface of the cylindrical portion 18 through interference fit in such a manner that the radially inward flange 61a becomes flush with an axially outer end portion face of the cylindrical portion 18, whereby even when driving the vehicle in the rain or the like, the damage of the IC tag 23 can be prevented effectively by the radially inward flange 61a which would otherwise be caused by virtue of the collision of foreign matters such as muddy water and/or small stones which are flung up from the road surface with the IC tag 23.

Alternatively, the holding member of the embodiment may be formed into a bottomed cylindrical shape, so that the IC tag 23 can be fixed to either an inner peripheral surface or a bottom portion of an annular portion thereof.

Figure 14:
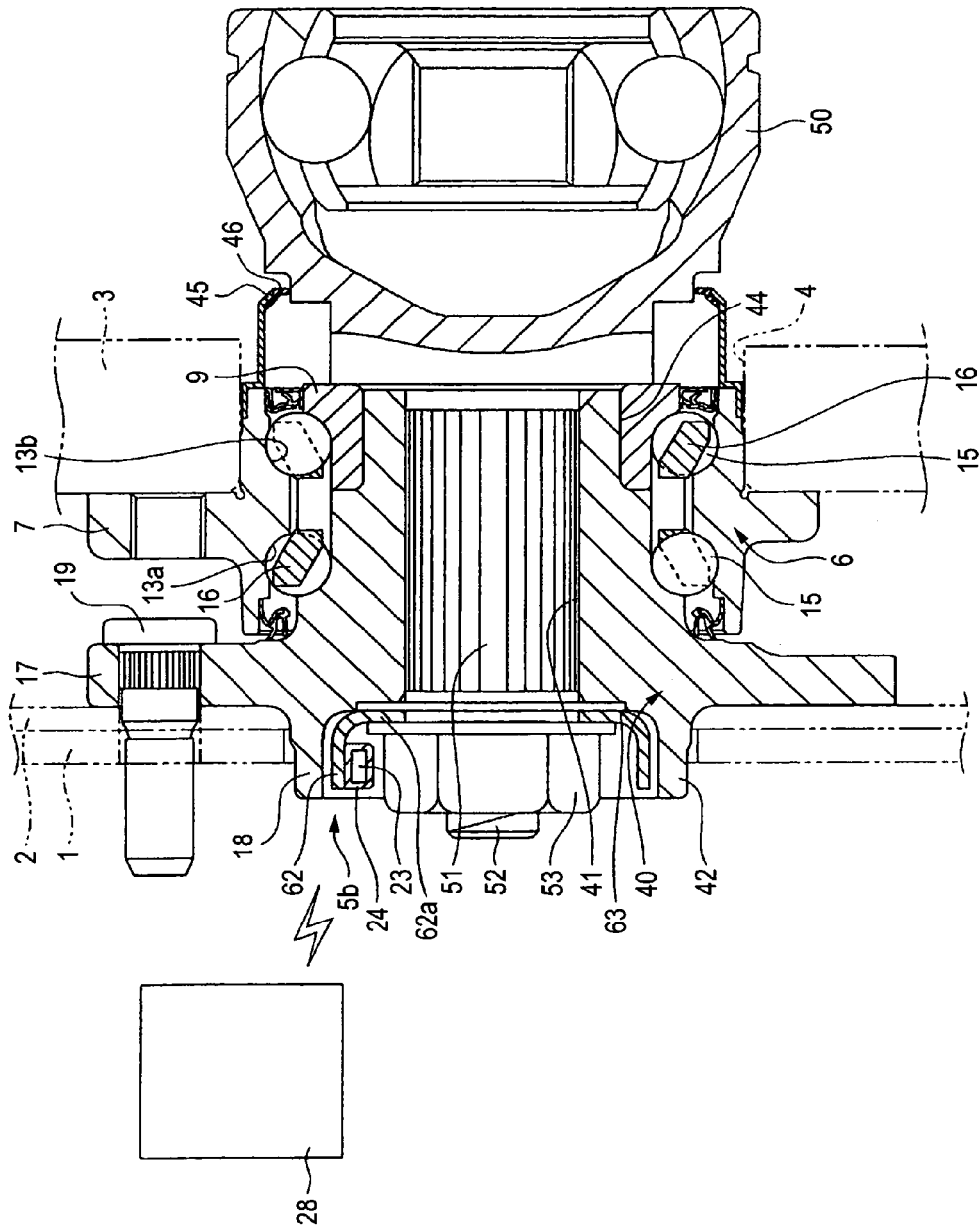
FIG. 14 is a sectional view showing a wheel supporting bearing unit according to another modified example to the seventh embodiment.

In addition, as a modified example to this embodiment, as shown in FIG. 14, a holding member 62 may have a flange 62a which extends radially inwards at an axially inner end portion thereof and be formed into an annular shape, and the holding member 62 may be held to a flat surface 63 formed between the cylindrical portion 18 and a splined portion 41 by means of the nut 53 while being held therebetween, when the hub 40 is mounted on the constant velocity joint 50.

In the case of the wheel supporting bearing unit 5b shown in FIG. 14, however, since the mounting work of the IC tag 23 needs to be carried out at a site where the wheel supporting bearing unit 5b for driving wheels is mounted on the constant velocity joint 50, the wheel supporting bearing units for driving wheels shown in FIGS. 12 and 13 are more preferred in that they can reduce the work that has to be carried out at the site.

Figure 15:
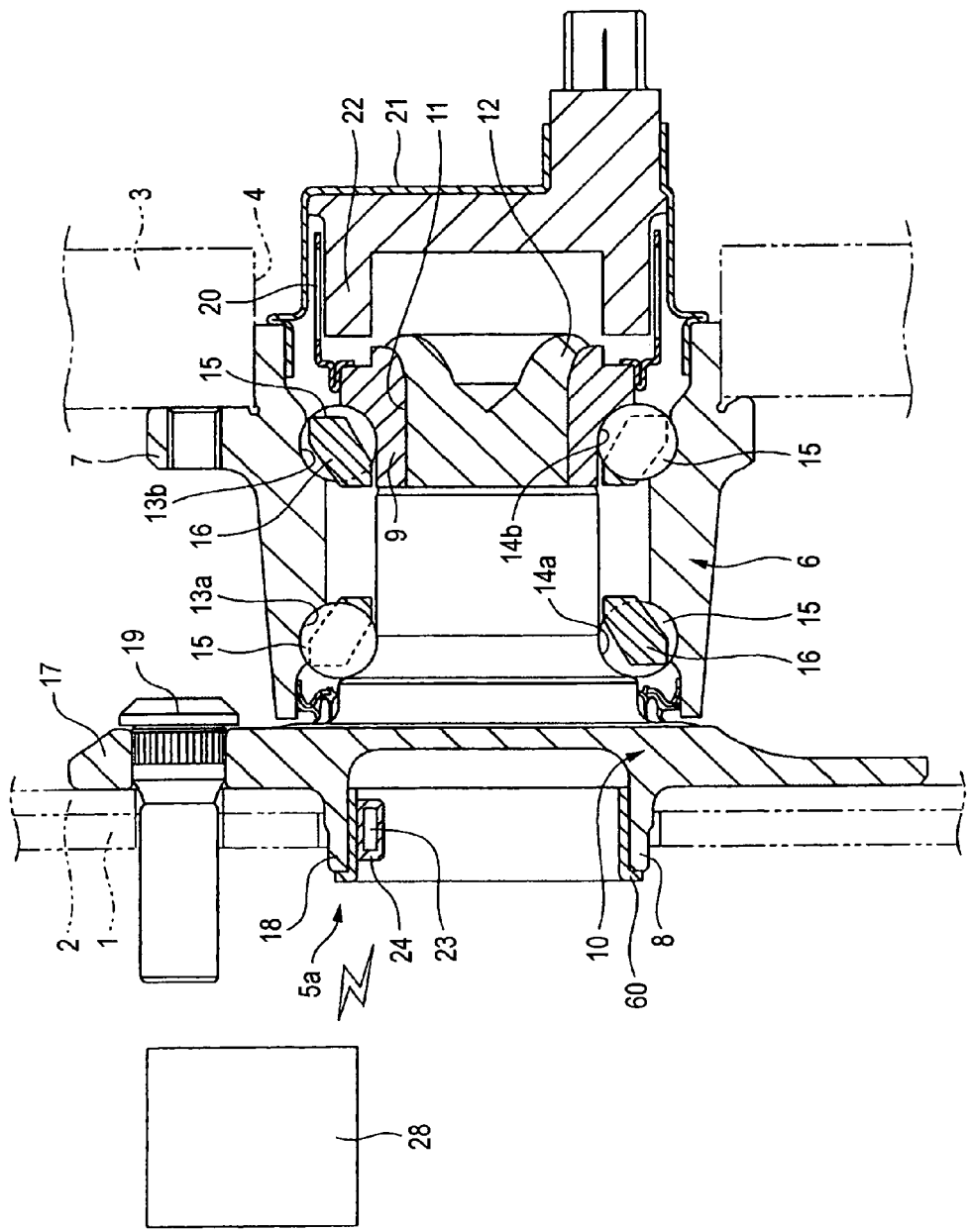
FIG. 15 is a sectional view showing a wheel supporting bearing unit according to a further modified example to the seventh embodiment.

Furthermore, as a modified example to this embodiment, the IC tag mounting methods shown in FIGS. 12 and 13 can also be applied to the wheel supporting bearing unit 5a for driven wheels, and for example, as shown in FIG. 15, the holding member 60 can be fixed to the inner peripheral surface of the cylindrical portion 18 of the hub main body 8 through interference fit.

In addition, the holding members 60, 61 may be formed into an annular shape as shown in FIGS. 12 and 13 or into a bottomed cylindrical shape, and as this occurs, the IC tag 23 can be mounted on an inner peripheral surface or a bottom portion of the holding member which is formed into the bottomed cylindrical shape.

Eighth Embodiment

Figure 16:
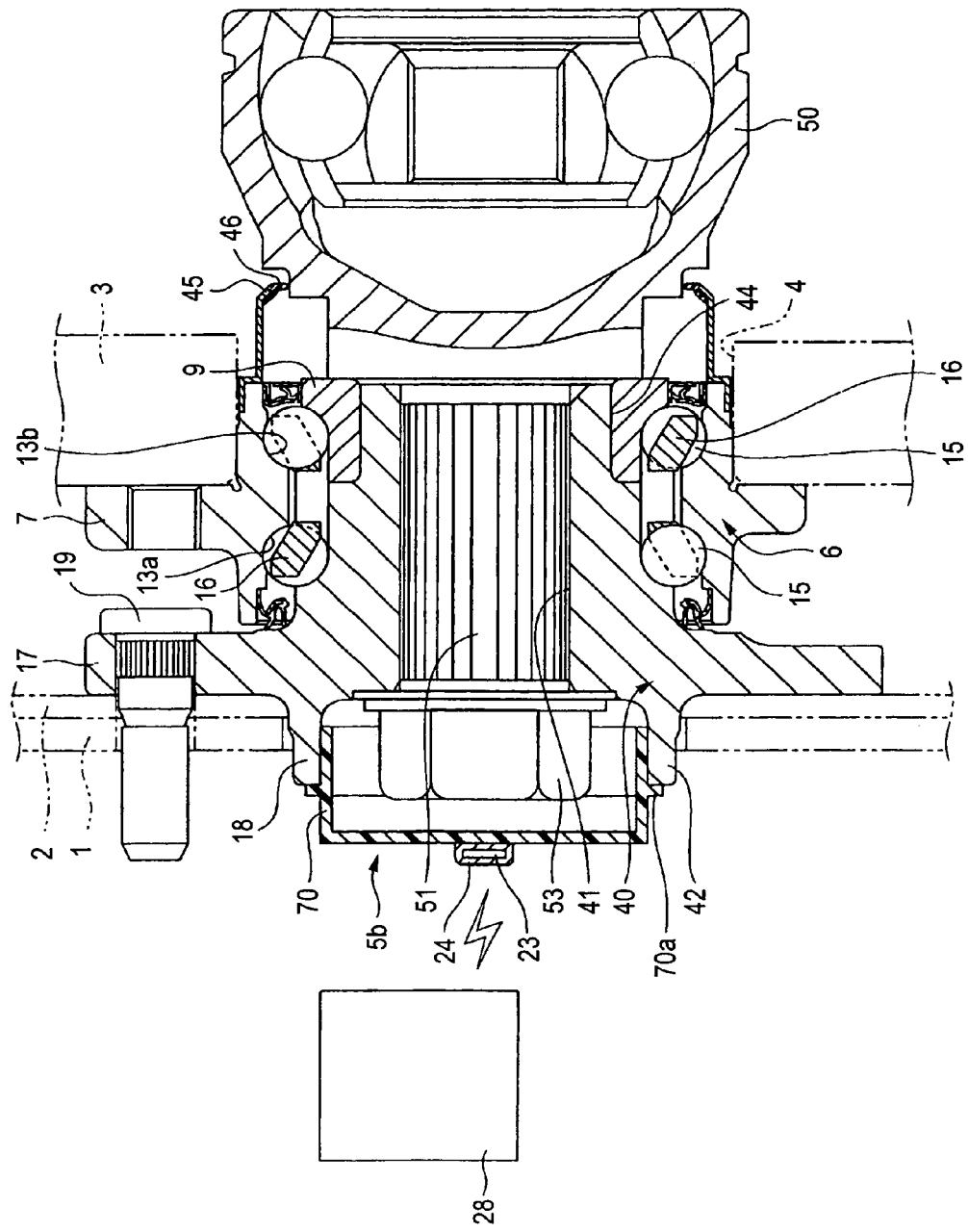
FIG. 16 is a sectional view showing a wheel supporting bearing unit according to an eighth embodiment of the invention.

FIG. 16 shows a wheel supporting bearing unit according to an eighth embodiment of the invention. In the case of this embodiment, a resin cap 70 which is a holding member for holding an IC tag 23 is fixed to an axially outer end portion of a hub 40 which constitutes a rotational ring, so as to accomplish an increase in traceability of a wheel supporting bearing unit 5b. The overall construction of this wheel supporting bearing unit 5b, as well as constructions and functions of other portions thereof are similar to those of the wheel supporting bearing unit for driving wheels which has been described before as the modified example to the fourth embodiment. Due to this, like reference numerals are imparted to like portions of this embodiment, so as to omit or simplify the repetition of similar descriptions.

In the case of this embodiment, the cap 70 is formed into a bottomed cylindrical shape and has a radially outward flange 70a at a radially intermediate portion of an annular portion thereof, and an outer peripheral surface of the cap 70 is fitted in an inner peripheral surface of a cylindrical portion 18 of a hub main body 42 through interference fit until the radially outward flange 70a is brought into abutment with an axially outer end portion face of the cylindrical portion 18. In addition, an IC tag 23 is fixed to a central portion of an axially outer end portion face of the cap 70, which is a bottom portion thereof, with an adhesive 24.

By adopting this configuration, an external device 28 is allowed to receive historical information from the IC tag 23 more easily than the case of the sixth embodiment where the IC tag 23 is fixed to the resin cover 48 which is located close to the axially inner end portion. In addition, the cap 70 needs to be removed temporarily when a nut 53 is fastened on to a threaded shaft 52 of a constant velocity joint 50, however, in the event that the nut is designed so as not to be fastened unless the cap 70 is set in a writing machine of a nut fastening machine, a fastening torque of the nut 53 can also be written in the IC tag 23 in an ensured fashion.

In addition, since the IC tag 23 is fixed to the central portion of the bottom portion of the cap 70, the effect of centrifugal force applied to the IC tag 23 can be suppressed as small amount, thereby making it possible to prevent the fall of the IC tag 23 from the hub 40. The other configuration and functions of this embodiment are similar to those of the seventh embodiment that has been described above.

Figure 17:
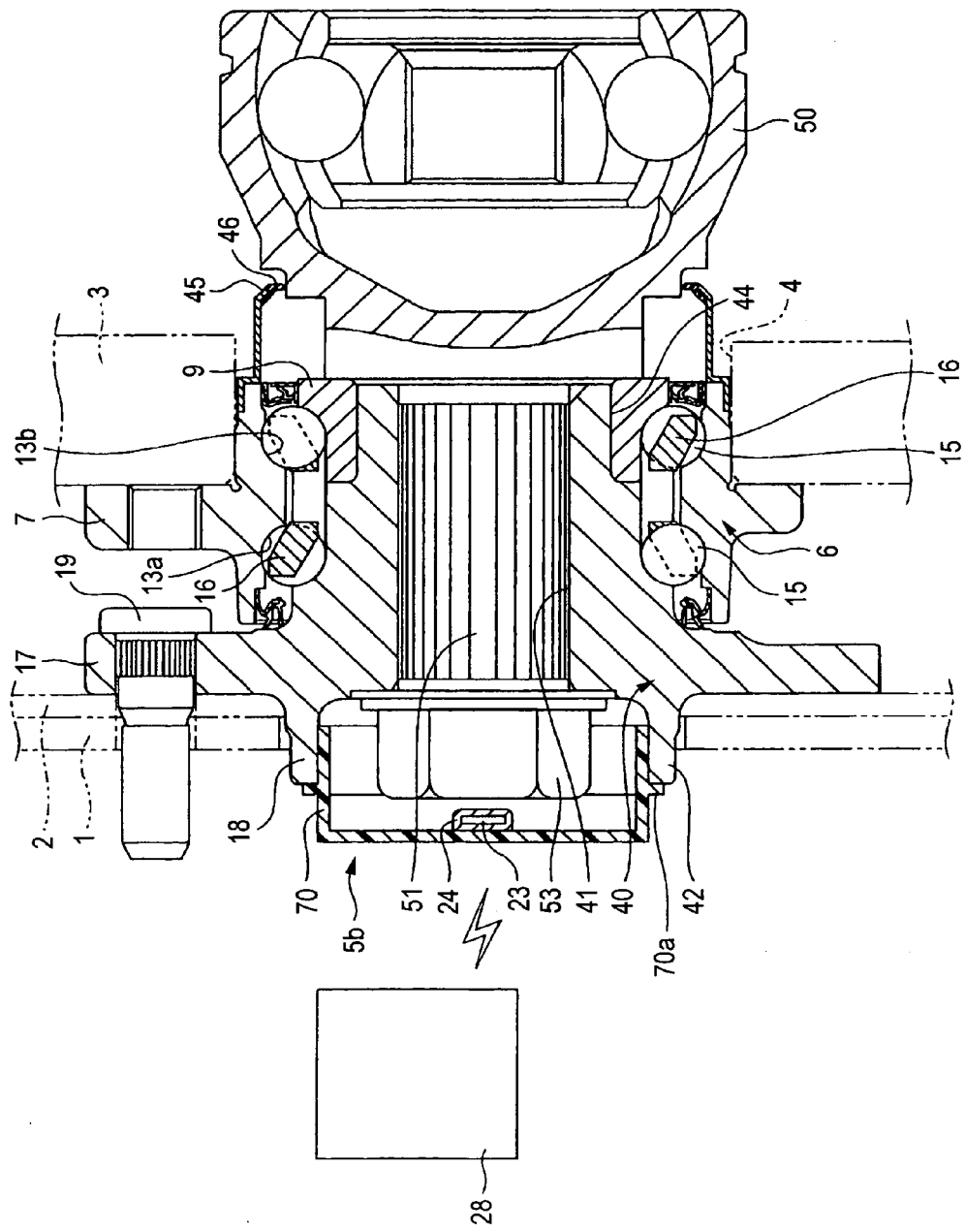
FIG. 17 is a sectional view showing a wheel supporting bearing unit according to a modified example to the eighth embodiment.
Figure 18:
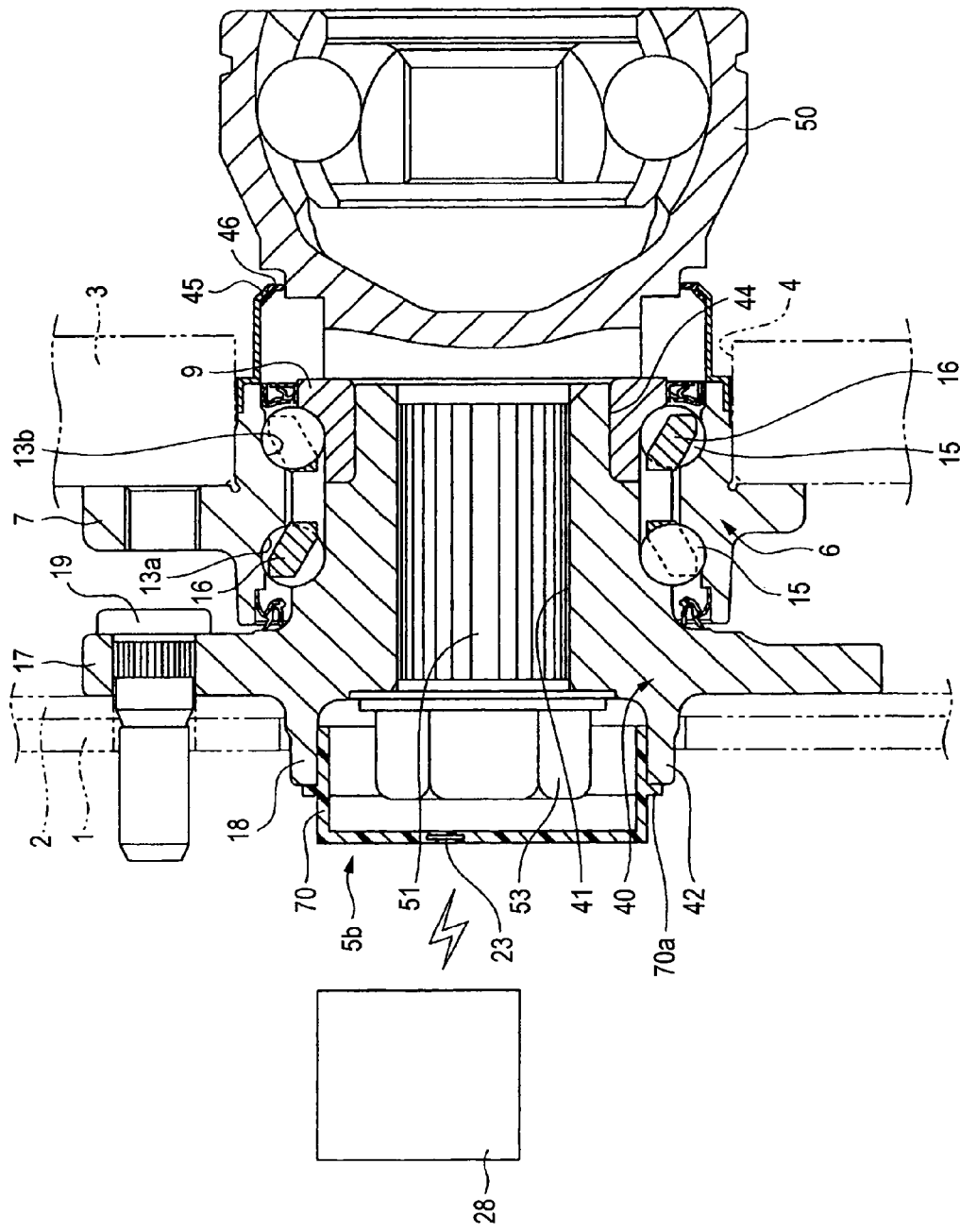
FIG. 18 is a sectional view showing a wheel supporting bearing unit according to another modified example to the eighth embodiment.

Note that as a modified example to this embodiment, as shown in FIG. 17, the IC tag 23 may be fixed to a central portion of an axially inboard end face of the bottom portion of the cap 70, or the IC tag 23 may be fixed to an inner peripheral surface of the annular portion of the cap 70. Additionally, as shown in FIG. 18, the IC tag 23 may be molded integrally with the cap 70 when molding the cap 70 in such a manner as to be surrounded or embedded in the cap 70, whereby the IC tag 23 does not have to be fixed by a separate fixing means such as an adhesive and hence can be set easily.

Note that although it does not matter what types of IC tags are used in the invention, in consideration of the fact that IC tags are fixed to hubs, outer rings and the like which are made of steel such as high carbon chromium bearing steel, IC tags which can deal with metal can enable an accurate radio communication without being affected by a metal having magnetism and hence, it is preferable to use those IC tags. In addition, the method of fixing the IC tag is not limited to the fixing through adhesion using the adhesive, and hence, the IC tag may be fixed through braising (soldering) using a braising material. Additionally, instead of covering the surface of the IC tag with the adhesive, a waterproofing treatment such as lamination may be applied to the surface of the IC tag.

In addition, the embodiments of the invention can be combined together in a proper fashion to carry out the invention without departing from the scope of the invention.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:
1. A wheel supporting bearing unit comprising:
 a stationary ring connected to a vehicle body side and comprising:
  a stationary side peripheral surface; and
  a stationary side raceway on the stationary side peripheral surface;
 a rotational member connected to a wheel side and comprising:
  a rotational side peripheral surface opposing to the stationary side peripheral surface;

a rotational side raceway provided on the rotational side peripheral surface, and opposing to the stationary side raceway; and a mounting flange to which a wheel is fixed and which is provided at a part of an outer peripheral surface of the rotational member which lies closer to an axially outer end side; and a cylindrical portion protruded from an axially outer end face of the rotational member;

a plurality of rolling elements disposed between the stationary side raceway and the rotational side raceway and an IC chip which is capable of storing information of the wheel supporting bearing unit, wherein the cylindrical portion is provided on a rotational axis of the rotational member and the IC chip directly fixed to an inner face of the cylindrical portion of the rotational member.

2. The wheel supporting bearing unit as set forth in claim 1, wherein the IC chip is fixed to at least a part of the axially outer end portion of the rotational ring which lies radially further inwards than the cylindrical portion or a part of an inner circumferential surface of the cylindrical portion.

3. A driven wheel supporting bearing unit comprising:

a stationary member connected to a vehicle body side and comprising:

a stationary side peripheral surface; and a stationary side raceway on the stationary side peripheral surface;

a rotational member connected to a driven wheel side and comprising:

a rotational side peripheral surface opposing to the stationary side peripheral surface;

a rotational side raceway provided on the rotational side peripheral surface, and opposing to the stationary side raceway; and a mounting flange to which a wheel is fixed and which is provided at a part of an outer peripheral surface of the rotational member which lies closer to an axially outer end side; and a cylindrical portion protruded from an axially outer end face of the rotational member;

a plurality of rolling elements disposed between the stationary side raceway and the rotational side raceway; and an IC chip which is capable of storing information of the wheel supporting bearing unit, wherein the cylindrical portion is provided on a rotation axis of the rotational member and the IC chip is directly fixed to an inner face of the cylindrical portion of the rotational member.

4. The wheel supporting bearing unit as set forth in claim 3, wherein the IC chip is fixed to a part of an inner circumferential surface of the cylindrical portion.

* * * * *